(12) United States Patent
Rothe

(10) Patent No.: US 12,445,200 B2
(45) Date of Patent: Oct. 14, 2025

(54) RADIATION-FIELD-ASSISTED HYBRID OBJECT-SUPPLY SYSTEM

(71) Applicant: Cleanuvator Patentgesellschaft mbH, Herzogenaurach (DE)

(72) Inventor: Lutz Rothe, Hummelshain (DE)

(73) Assignee: Cleanuvator Patentgesellschaft, Herzogenaurach (DE)

( * ) Notice: Subject to any disclaimer, the term of this patent is extended or adjusted under 35 U.S.C. 154(b) by 259 days.

(21) Appl. No.: 18/276,728

(22) PCT Filed: Feb. 10, 2022

(86) PCT No.: PCT/EP2022/053280
§ 371 (c)(1),
(2) Date: Aug. 10, 2023

(87) PCT Pub. No.: WO2022/171753
PCT Pub. Date: Aug. 18, 2022

(65) Prior Publication Data
US 2024/0137123 A1   Apr. 25, 2024

(30) Foreign Application Priority Data
Feb. 11, 2021 (DE) .................. 10 2021 000 642.9

(51) Int. Cl.
*H04B 10/114* (2013.01)
*A61L 2/10* (2006.01)

(52) U.S. Cl.
CPC ............ *H04B 10/1149* (2013.01); *A61L 2/10* (2013.01); *A61L 2202/11* (2013.01); *A61L 2202/14* (2013.01); *A61L 2202/25* (2013.01)

(58) Field of Classification Search
None
See application file for complete search history.

(56) References Cited

U.S. PATENT DOCUMENTS 9,240,837 B2 * 1/2016 Sleator .............. H04B 10/1149
11,166,415 B2 * 11/2021 Barber, III ............ A61L 2/0076
(Continued)

OTHER PUBLICATIONS

Xu et al., Ultraviolet Communications: Potential and State-of-the-Art, IEEE, 2008 (Year: 2008).*
(Continued)

*Primary Examiner* — Jai M Lee
(74) *Attorney, Agent, or Firm* — Smartpat PLC

(57) ABSTRACT

The content of the invention consists in the concept of an intelligent object/room supply and disinfection system which is harmless to health and the mode of action of which is based on the use of electromagnetic waves of the UV spectral range both for the generation of the bacterial and viral disinfection potential and for the transmission of audio, video and data information. The invention is directed to the operability of the following classes or areas of application and ensures bacterial and viral inactivation of animate stationary and mobile enclosed or semi-enclosed:

Figure 5:
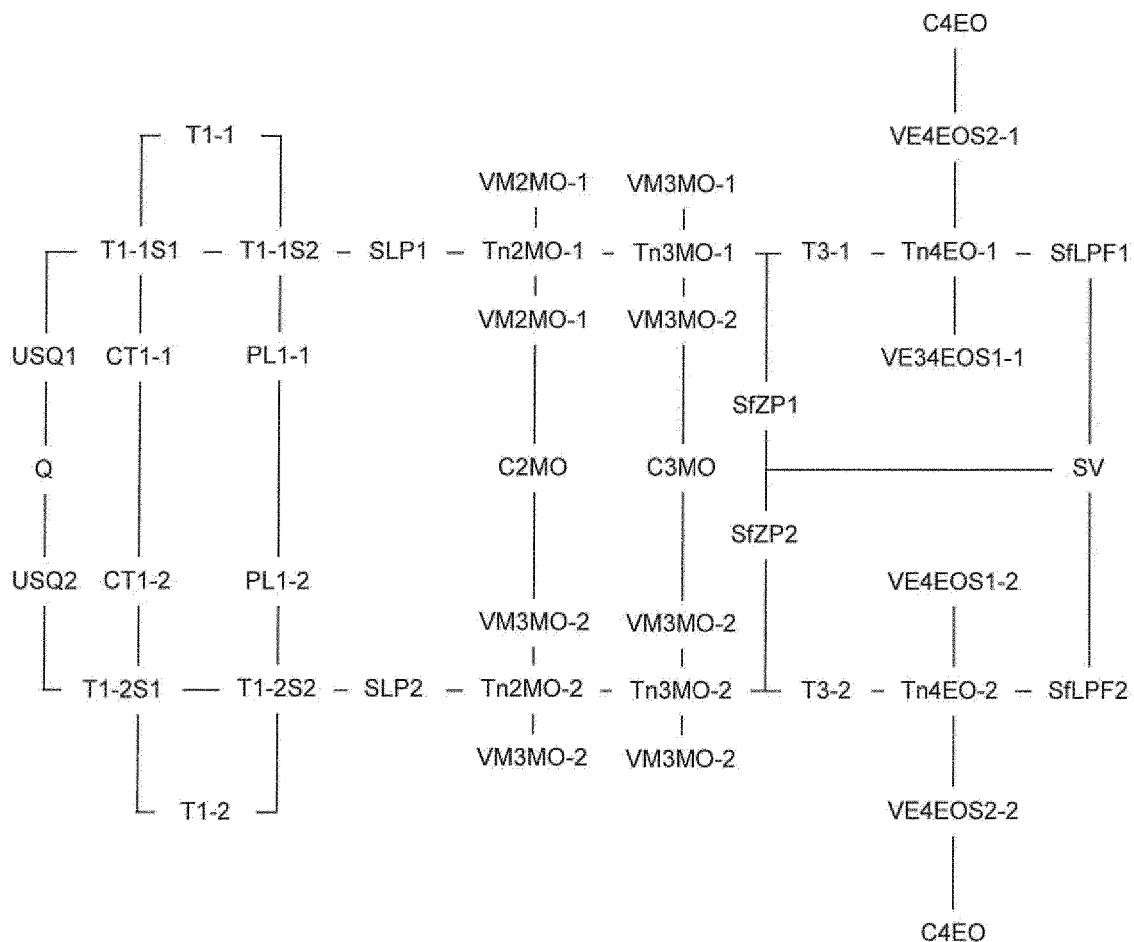

1. large objects such as cultural, sports and event venues;
2. institutional and public objects such as buildings of public life, health care, education and higher education;
3. cabins such as the passenger cabins of land, air and sea passenger transportation means;
4. objects of animal breeding, animal husbandry and veterinary medicine.

The inactivation is based on the continuous-wave interaction of electromagnetic radiation fields within the wavelength range between 190 nm and 230 nm and the programmable and/or auto-adaptive generation capability of continuous and/or discrete radiation spectra with controllable temporal and spatial signal signatures.

8 Claims, 5 Drawing Sheets

(56) References Cited

U.S. PATENT DOCUMENTS

| | | | | |
|---|---|---|---|---|
| 11,786,616 | B2* | 10/2023 | Ashrafi | A61L 2/025 422/20 |
| 2024/0058489 | A1* | 2/2024 | Hietbrink | A47K 13/302 |

OTHER PUBLICATIONS

Buonanno, M., Ponnaiya, B., Welch, D., Stanislauskas, M., Randers-Pehrson, G., Smilenov, L., Lowy, F.D., Owens, D.M., Brenner, D.J., (2017) "Germicidal Efficacy and Mammalian Skin Safety of 222-nm UV Light" Radiation Research 187(4), 493-501. https://doi.org/10.1667/RR0010CC.1.

Changwei Li et al.: Airborne transmission of COVID-19: epidemiologic evidence from two outbreak investigations. Research Gate, doi: 10.13140/RG.2.2.36685.38881.

Cheng VCC, Wong SC, Chen JHK, Yip CCY, Chuang VWM, Tsang OTY et al.: Escalating infection control response to the rapidly evolving epidemiology of coronavirus disease 2019 (COVID-19) due to SARS-COV-2 in Hong Kong. Cambridge University Press, Mar. 5, 2020, doi: 10.1017/ice.2020.58.

Dongyu Guo: Evaluation of coronavirus in tears and conjunctival secretions of patients with SARS-CoV-2 infection. In: Journal of Medical Virology. Feb. 18, 2020, doi: 10.1002/jmv.25725.

Gene Emery: Coronavirus can persist in air for hours and on surfaces for days: study. In: Reuters. Mar. 17, 2020, accessed Aug. 16, 2020.

How COVID-19 Spreads. In: website of the US Center for Disease Control and Prevention (CDC). Feb. 17, 2020, accessed Feb. 23, 2020.

Information from the BAuA: Novel virus SARS-CoV-2 (previously 2019-nCoV) classified in risk group 3 by the ABAS and recommendations for laboratory diagnostics given. In: website of the Federal Institute for Occupational Safety and Health (BAuA). Feb. 19, 2020, accessed Feb. 23, 2020.

J . Lu, J. Gu, K. Li et al.: COVID-19 outbreak associated with air conditioning in restaurant, Guangzhou, China, 2020.In: Emerging Infectious Diseases. Jul. 2020, doi: 10.3201/eid2607.200764.

Jasper Fuk-Woo Chan, Shuofeng Yuan, Kin-Hang Kok et al.: A familial cluster of pneumonia associated with the 2019 novel coronavirus indicating person-to-person transmission: a study of a family cluster. In: The Lancet. Jan. 24, 2020, doi:10.1016/S0140-6736(20)30154-9.

John A. Lednicky : Viable SARS-CoV-2 in the air of a hospital room with COVID-19 patients. In: International Journal of Infectious Diseases Sep. 15, 2020. doi:/10.1016/j.ijid.2020.09.025.

Joshua L. Santarpia et al.: Aerosol and surface contamination of SARS-CoV-2 observed in quarantine and isolation care. In: Nature. Jul. 29, 2020, doi: 10.1038/s41598-020-69286-3.

Lidia Morawska, Donald K. Milton: It is Time to Address Airborne Transmission of COVID-19 In: Clinical Infectious Diseases, ciaa939, https: // doi.org/10.1093/cid/ciaa939.

Lidia Morawska, Junji Cao: "Airborne transmission of SARS-CoV-2: The world should face the reality" . In: Environment International. doi: 10.1016/j.envint.2020. 105730.

Lirong Zou, Feng Ruan, Mingxing Huang et al.: SARS-CoV-2 Viral Load in Upper Respiratory Specimens of Infected Patients. In: The New England Journal of Medicine. Feb. 19, 2020, doi: 10.1056/NEJMc2001737.

Lydia Bouriba: Turbulent Gas Clouds and Respiratory Pathogen Emissions—Potential Implications for Reducing Transmission of COVID-19. In: JAMA. Mar. 26, 2020, doi: 10.1001/jama.2020.4756.

Manuela Buonanno, David Welch, Igor Shuryak, David J. Brenner: Center for Radiological Research, Columbia University Irving Medical Center, New York : Far-UVC light efficiently and safely inactivates airborne human coronaviruses In : nature research from Apr. 2020 doi: 10.21203/rs.3.rs-25728/v1.

Michelle L. Holshue, Chas DeBolt et al. for the Washington State 2019-nCoV Case Investigation Team: First Case of 2019 Novel Coronavirus in the United States. In: The New England Journal of Medicine. Jan. 31, 2020, doi: 10.1056/NEJMoa2001191.

N. van Doremalen, T. Bushmaker, D. H. Morris, M. G. Holbrook, A. Gamble, B. N. Williamson, A. Tamin, J. L. Harcourt, N. J. Thornburg, S. I. Gerber, J. O. Lloyd-Smith, E. de Wit, V. J. Munster: Aerosol and Surface Stability of SARS-CoV-2 as Compared with SARS-CoV-1. In: The New England Journal of Medicine. Mar. 17, 2020, doi: 10.1056/nejmc2004973.

Na Zhu, Dingyu Zhang, Wenling Wang et al.: A Novel Coronavirus from Patients with Pneumonia in China. In: The New England Journal of Medicine. 2019, doi: 10.1056/NEJMoa2001017.

Nicky Phillips, Smriti Mallapaty, David Cyranoski: How quickly does the Wuhan virus spread? In: Nature. Jan. 21, 2020, doi: 10.1038/d41586-020-00146-w.

Nozomi Yamano, Makoto Kunisada, Sachiko Kaidzu, Kazunobu Sugihara, Aiko Nishiaki-Sawada, Hiroyuki Ohashi, Ai Yoshioka, Tatsushi Igarashi, Akihiro Ohira, Masaki Tanito, and Chikako Nishigori : Long-term effects of 222 nm ultraviolet radiation C sterilizing lamps on mice susceptible to ultraviolet radiation In : Photochemistry and Photobiology; doi: 10.1111/php.13269.

Press Release of Signify Corporate Communications from Jun. 16, 2020: Signify and Boston University validate effectiveness of Signify's UV-C light sources on inactivating the virus that causes COVID-19 In: https://www.signify.com/b-dam/signify/en-aa/about/news/2020/20200616.

Rich M. Simons, Ernest R. Blatchley III, Karl G. Linden : International Ultraviolet Association . 6935 Wisconsin Avenue : Far UV-C in the 200-225 nm range, and its potential for disinfection applications . Report from Jul. 2020.

SARS-CoV-2 Fact Sheet on Coronavirus Disease-2019 (COVID-19), RKI, as of Oct. 16, 2020, accessed Oct. 25, 2020.

SARS-CoV-2 Fact Sheet on Coronavirus Disease-2019 (COVID-19). Robert Koch Institute, Mar. 23, 2020, accessed Aug. 14, 2020.

Sean Wei Xiang Ong, Yian Kim Tan, Po Ying Chia et al.: Air, Surface Environmental, and Personal Protective Equipment Contamination by Severe Acute Respiratory Syndrome Coronavirus 2 (SARS-CoV-2) From a Symptomatic Patient. Mar. 4, 2020, doi: 10.1001/jama.2020.3227.

Transmission of SARS-CoV-2: implications for infection prevention precautions, WHO Scientific Brief, Jul. 9, 2020; accessed Oct. 4, 2020.

Z-D Guo, Z-Y Wang, S-F Zhang et al.: Aerosol and surface distribution of severe acute respiratory syndrome coronavirus 2 in hospital wards. Wuhan, China 2020. in: Emerging Infectious Diseases. (Emerg. Infect. Dis.) Jul. 2020, doi: 10.3201/eid2607.200885.

Zhangkai J. Cheng, Jing Shan: 2019 Novel coronavirus: where we are and what we know. In: Infection. Feb. 18, 2020, doi: 10.1007/s15010-020-01401-y.

* cited by examiner

TRANSMISSION-RELATED SYSTEM CONFIGURATIONS
Configurations 1.1 / 1.2
System configuration 1.1:
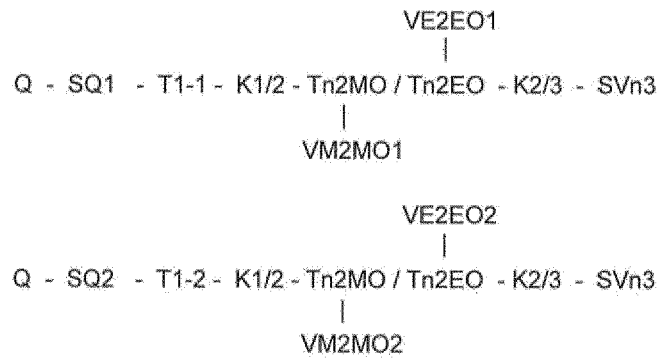
System configuration 1.2:
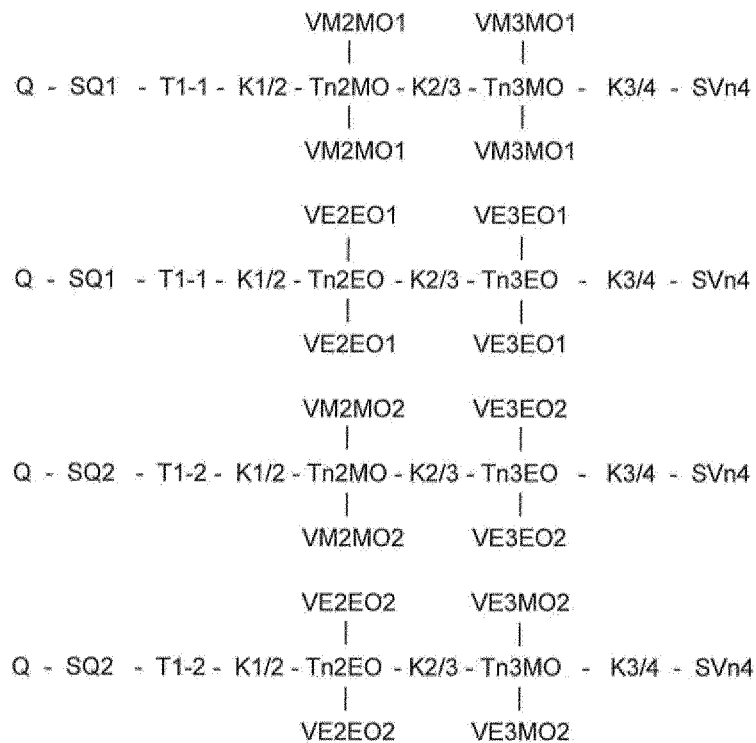
FIGURE 1

TRANSMISSION-RELATED SYSTEM CONFIGURATIONS
Configurations 1.3
System configuration 1.3:
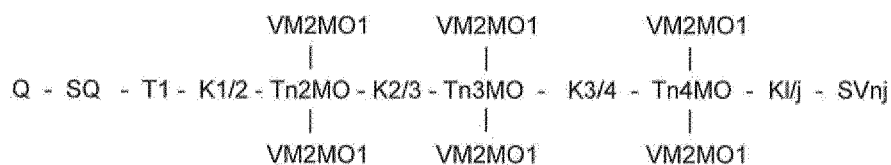
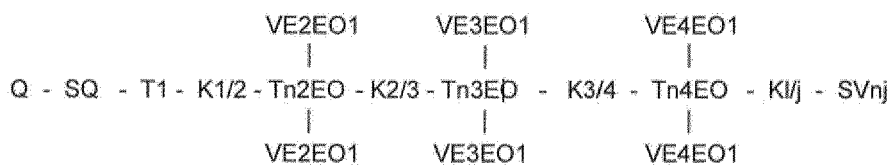
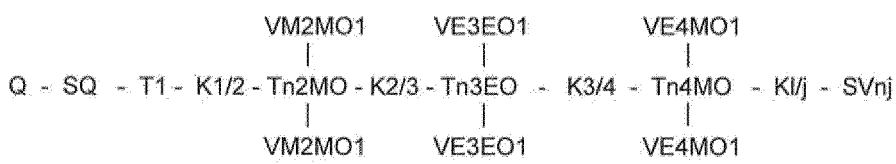
FIGURE 2

TRANSMISSION-RELATED SYSTEM CONFIGURATIONS
Configurations 2.1 / 2.2
System configuration 2.1:
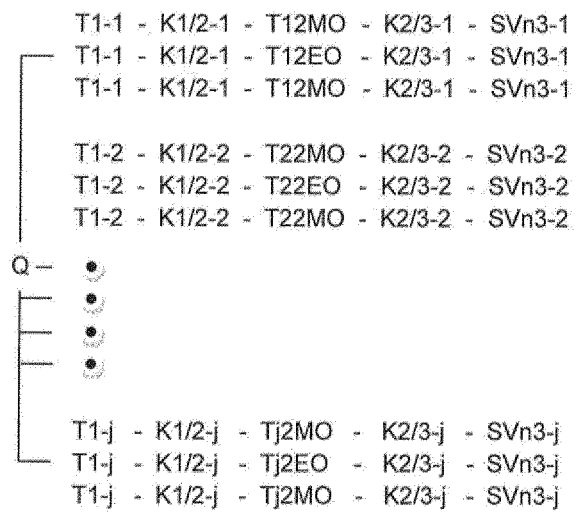
System configuration 2.2:
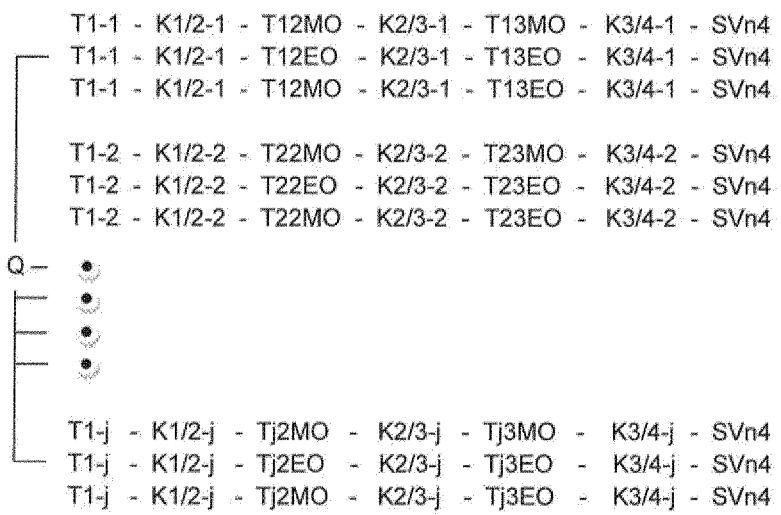
FIGURE 3

TRANSMISSION-RELATED SYSTEM CONFIGURATIONS
Configuration 2.3

```
    T1-1  -  K1/2-1 - T12MO - K2/3-1 - T13MO - K3/4-1-T14MO  • •  Kl/m-1-SVno-1
  ┌ T1-1  -  K1/2-1 - T12EO - K2/3-1 - T13EO - K3/4-1-T14EO  • •  Kl/m-1-SVno-1
  │ T1-1  -  K1/2-1 - T12MO - K2/3-1 - T13EO - K3/4-1-T14EO  • •  Kl/m-1-SVno-1
  │
  │ T1-2  -  K1/2-2 - T22MO - K2/3-2 - T23MO - K3/4-2-T24MO  • •  Kl/m-2-SVno-2
  │ T1-2  -  K1/2-2 - T22EO - K2/3-2 - T23EO - K3/4-2-T24EO  • •  Kl/m-2-SVno-2
  │ T1-2  -  K1/2-2 - T22MO - K2/3-2 - T23EO - K3/4-2-T24EO  • •  Kl/m-2-SVno-2
Q ┤       •
  │       •
  │       •
  │       •
  │
  │ T1-j  -  K1/2-j - Tj2MO  - K2/3-j - Tj3MO - K3/4-j - Tj4MO  • •  Kl/m-j - SVno-j
  └ T1-j  -  K1/2-j - Tj2EO  - K2/3-j - Tj3EO - K3/4-j - Tj4EO  • •  Kl/m-j - SVno-j
    T1-j  -  K1/2-j - Tj2MO  - K2/3-j - Tj3EO - K3/4-j - Tj4EO  • •  Kl/m-j - SVno-j
```

FIGURE 4

RADIATION-FIELD-ASSISTED HYBRID OBJECT-SUPPLY SYSTEM

OBJECT OF THE INVENTION

From a technical point of view, the extent of wireless telecommunicative exchange of information to be served or expected today and even more so in the future requires above all the availability of high spectral bandwidths and this on the basis of high and highest frequencies. While electromagnetic waves of the high-frequency and microwave range, in addition to their advantageous property of being able to transmit data and information quickly, are accompanied by a number of health hazards that have to be considered in a differentiated manner, electromagnetic waves of the optical spectral range basically offer a much more comfortable basis in this respect. Electromagnetic waves of the optical spectral range and in this context including the visible part of this spectrum as well as the infrared and ultraviolet part of the spectrum are regarded as physical conditions without the existence of which the existence of life and thus also of human life is hardly imaginable. We also know about both beneficial and detrimental effects of ultraviolet and infrared waves, which, starting from the visible part of our electromagnetic wave spectrum, join both shorter and longer waves. Here, both health-promoting and health-threatening aspects come into closer focus. These aspects illustrate and touch in a very complex way a plurality of physical, biological and biophysical effects, which can be achieved by infrared or ultraviolet wave fields, wherein the human biological effects are in the foreground of the present interest. If the horizon of observation is extended, the interaction between electromagnetic waves and biological organisms exposed on this basis can be used to derive perspective-rich mechanisms of the targeted influenceability of our animate macroscopic as well as microscopic environment. In this respect, the electromagnetic wave spectrum of visible and invisible light waves also offers the approach for solving elementary objects of health care. In this context, the condition of our immediate living space with its biological, chemical and physical or biochemical and biophysical observables is of significant importance. The health compatible design as well as the health harmless preservation and condition of all immediate living spaces takes a key position in the context of our industrialized civilization. In this respect the ensuring of a progressive health care is unmistakably bound to the efficiency of the living space supply and here in the narrower sense with the efficiency of the room and object-supply. Assuming this correlation, those approaches to solutions which are based on the profiling of natural biological or biochemical or biophysical mechanisms and which allow their solution-oriented development on a technical basis are unmistakably gaining in importance.

The targeted implementation of this solution strategy leads to the solution approach of qualifying or distinguishing IR (InfraRed) photonic and VIS (Visible) photonic system/network components as well as UV (Ultraviolet) photonic system/network structures or access portals both for the broadband/ultra broadband coverage of stationary and portable or mobile users or user groups within closed and semi-closed rooms and objects or areas and for the configuration of non-contact spatial disinfection and inactivation technologies with the functionality of contact-free and contactless disinfection and inactivation.

In this respect and derived therefrom, the object of the invention results from the combination of an actoric target segment and an information technology target segment. In this case, the actoric target segment of the invention comprises the configuration of an intelligent object/room disinfection system the mode of operation and action of which is based on the use of electromagnetic waves of the ultraviolet spectral range for the generation of the spatial bacterial and viral disinfection potential. The information technology target segment of the invention includes the configuration of an intelligent object/room supply system for the wireless spatial transmission of audio, video, and data information.

The narrower actoric objective of disinfection consist in the bacterial and viral inactivation of the room air of rooms and objects occupied by humans as well as of the surfaces of objects and objects stationary and/or moving in these rooms and objects. On the other hand, the narrower information technology objective of object/room supply consists in ensuring 5G/NG (nextgeneration) supply of the communication technology terminals or access devices stationary or mobile in the room over the entire room and area. Both objectives are to be achieved on the basis of the joint or bifunctional use of an electromagnetic wave field of the UV-(ultraviolet)-C-wavelength range in its capacity as a medium of effect or transmission.

Field of Application of the Invention

The naturally grown as well as the artificially created environment of humans is contaminated in many different ways with microorganisms such as viruses, bacteria, yeasts as well as fungi and their spores in heterogeneous colonization structure and different graduation as well as associated with very different health risk. In this context, airborne microorganisms are found to have a high probability of occurrence or a high concentration within particularly heavily frequented areas, such as buildings and sites of public and cultural life, buildings and facilities of the health and care system, buildings and facilities of the school and education system, large-capacity means of passenger transport and their access facilities of private and public land-, air- and sea-based local and long-distance transport, as well as buildings and facilities of the producing and service-providing industry. Such microorganisms pose a variable and only partially detectable risk potential for the health of persons, the viability of raw materials and the preservability of foodstuffs. Their reliable and sustainable inactivation on a non-contact and non-hazardous basis represents a highly topical application potential with global dimensions and a key position in terms of health strategy.

The invention proceeds on this basis as well as purposefully with the potential for operability of the classes of applications or fields of application set forth below:

1. bacterial and viral inactivation of animate stationary enclosed or semi-enclosed large-scale objects and buildings, such as cultural, sports and event venues, transport buildings (airports, seaports, railroad stations), industrial and large-scale manufacturing facilities of all value-added sectors, as well as large-scale storage and logistics facilities of the trade and utilities sector;
2. bacterial and viral inactivation of animate stationary closed or semi-closed institutional and public objects, such as buildings of public life, buildings of health and care, buildings of education and higher education, buildings of banking, trade and services, buildings of catering, hotel and accommodation industry and residential properties;

3. bacterial and viral inactivation of animate closed or semi-closed cabins:
   terrestrial mobile means of passenger transportation, such as rail vehicles (local and long-distance trains/streetcars/subways) of all classes, local and long-distance buses, and passenger motor vehicles;
   airborne means of passenger transportation, such as aircraft and drones;
   seaborne means of passenger transportation, such as ocean-going vessels and inland waterway vessels, as well as ocean-going ferries and inland waterway ferries;
4. bacterial and viral inactivation of animate closed or semi-closed both stationary and mobile special objects, such as buildings and objects of defense and security; buildings and objects of law enforcement and security custody;
5. bacterial and viral inactivation of animate closed or semi-closed both stationary and mobile objects of the individual sector;
6. bacterial and viral inactivation of animate closed or semi-closed objects of animal breeding as well as animal husbandry and veterinary medicine.

The field of application of the invention in terms of information technology relates to the global information technology supply of stationary, portable and mobile users of any audio/video/data telecommunication as well as telemetry and telematics services within closed and semi-closed rooms, objects and areas. In this respect, the main application focus is on human-to-human communication (PtP) as well as the significantly increasing importance of human-to-machine communication (PtM) and machine-to-machine communication (MtM). Other key applications are the IoT (Internet of Things), IIoT (Industrial Internet of Things) and INDUSTRY 4.0 applications, which are characterized by information technology and have a key role to play, as well as VR (Virtual Reality), TR (TeleReality) and AR (Augmented Reality) applications, which are gaining in importance and growth both for INDUSTRY 4.0 applications and for other areas of society and individual life. Likewise, the modular availability of wireless high-speed networks and the associated wireless access portals with high-speed potential form the distinguishing basis for qualitatively new market segments with key positions and significant growth potential, such as Industry 4.0-related tele-robotics, tele-medicine, tele-mobility and vehicle autonomy, tele-security, tele-logistics, tele-management and tele-learning.

In this context and on this basis, the current market of both stationary and mobile information and communication technology is characterized by the primary requirement for the availability of location-independent ultra-fast information access and information transmission networks based on ultra-broadband network components.

Characteristics of the Known Prior Art

The derivation of the actoric target segment of the objective of the invention is based on the following evaluation of the known prior art. It has been proven that the naturally grown as well as artificially created living environment of humans is polluted in the most diverse manner with microorganisms in a heterogeneous colonization structure and different graduation as well as associated with this also with very differentiated health risk. In this context, airborne microorganisms are found to have a high probability of occurrence or a high concentration within particularly heavily frequented areas, such as buildings and sites of public and cultural life, buildings and facilities of the health care system, buildings and facilities of the school and education system, large-capacity means of passenger transport and their access facilities of private and public land-, air- and sea-based local and long-distance transport, as well as buildings and facilities of the manufacturing and service industries. Such microorganisms represent a variable and only partially detectable hazard potential for the health of persons, the stockability of raw materials and the preservability of foodstuffs.

The detectability and controllability of both the vital and latent hazard potential associated with exposure to microorganisms represents one of the most urgent challenges of preventive health care and health maintenance. The prognostic possibilities and application-ready mechanisms available in this context form the basis and prerequisite at the same time for effective protection against the emergence, formation and spread of any epidemic or pandemic life scenarios.

The triggering of the COVID-19—disease with its accompanying pandemic dimensions since 01-2020 is based on the Betacorona virus SARS-CoV-2, the first identification of which succeeded in January of 2020 on the basis of isolates from pneumonia patients /02/. Detection of the virus has so far been in nasopharyngeal secretions, sputum, stool, tear fluid, blood, and aerosols and surfaces /01/, /03/, /04/, /05/. The main route of transmission for SARS-CoV-2 is considered to be respiratory ingestion of virus-containing fluid particles during breathing, coughing, talking, or sneezing. The relevance or infectious efficacy of other routes or sites of transmission, such as stool, tear fluid, or blood, is currently under investigation.

Based on current knowledge, it is assumed that the virus spreads in the same way as other respiratory pathogens, mainly through the emission of virus-containing particles released by infected persons and then ingested by healthy persons. Person-to-person transmission via the exchange of virus-containing aerosols, i.e., the emission of aerosolized viruses and their transmission via ambient air or the respiratory reception of aerosolized viruses transmitted via ambient air, is to be evaluated as the primary transmission constellation. In this context, the transition between aerosol and droplet infection is fluid /31/. The WHO defines droplets as particles with a diameter of 5 μm to 10 μm. In contrast, particles with smaller diameters are referred to as aerosols /32/. While droplets sink to the ground at relatively short distances from the source due to their size, the residence probability of aerosols in the air is significantly greater. The risk of transmission by aerosols is significantly increased in small rooms with low ventilation and in activities with high particle emission /09/.

A biophysical study by MIT (Massachusetts Institute of Technology) experimentally established in 1-2020 that liquid particles can be spread up to eight meters when coughing or sneezing without a mechanical barrier. This result thus permanently challenges the droplet infection paradigm originating from the early twentieth century/11/.

Based on quantitative analysis of reverse transcription polymerase chain reaction (RT-PCR) studies of the nasopharynx, Chinese researchers demonstrated the transmissibility of the virus through aerosols in 02-2020 /12/, /13/. A study by the US National Institute of Allergy and Infectious Diseases (NIAID) supported this view using quantitative viral load determination in aerosols. The study showed that the viruses in artificially created aerosols remained viable and thus infectious for a minimum of three hours. Here, the number of infectious viruses in the artificially generated aerosols was halved only after about 66 minutes/14/, /15/. In 07-2020, a study was published that detected corona virus RNA-containing aerosols in the breath samples of asymptomatic to severely ill COVID-19 patients, assuming their floating stock in the air for a period of up to three hours /16/. In contrast, detailed airspace examinations of COVID-19 patients with high viral loads did not yield evidence of SARS-CoV-2 RNA in the patients' airways /17/, /18/.

Further investigations by Huoshenshan Hospital Wuhan/China report the detectability of the virus RNA at the exits of the ventilation system as well as in the indoor air of the hospital /19/. A review paper by Australian and Chinese researchers also assumes the high probability of COVID-19 presence in the air based on their data collection. The authors evaluate the inclusion of the airborne transmission route as essential in the context of infection prevention /22/. Further studies were able to provide evidence of the cultivability of replicable viruses from aerosols in the air of patient rooms. Based on their study results, the experimenters assume that patients with respiratory symptoms release infectious aerosol even without aerosol-forming medical procedures /24/. Other studies initiated at the Irving Medical Center of Columbia University /27/ confirm the inactivation potential of ultraviolet radiation within the wavelength range between 207 nm and 222 nm. In this context, successful inactivation of aerosolized influenza virus H1N1 using UV-C222 nm radiation with a radiant power density of <2 mJ/cm$^2$ has been reported. Furthermore, these studies were extended to the inactivability of aerosolized human corona virus alpha (HCoV-229E) and beta (HCoV-OC43) subgroups. The studies conducted in this context demonstrated the possibility of 99.9% inactivation of aerosolized alpha corona virus 229E as well as beta corona virus OC43 already at the generation of radiation power densities of >1.7 mJ/cm$^2$ and >1.2 mJ/cm$^2$, respectively. On the basis of the conducted experiments, it is deduced that it is possible to ensure 99.9% inactivation of aerosolized alpha-corona virus 229E as well as beta-corona virus OC43 under the condition of continuous-time exposure of the inactivation sector with a power density of 3 mJ/cm$^2$ per hour after an exposure time of 25 minutes. Here it is further assumed that the increase of the radiation power density to 6 mJ/cm$^2$ while ensuring or maintaining the health safety leads to a halving of the inactivation time. The experimenters assume that the results obtained experimentally are directly transferable to the inactivation efficiency of aerosolized human SARS-CoV-2 virus stocks. The report/28/of the International Ultraviolet Association refers to the need for profound long-term studies as well as the necessity of detailed investigations of exposure-related secondary effects or exposure-related photochemical reactions within cosmetics applied to the skin or cosmetically penetrated layers of the stratum corneum as well as skin-proximal/skin-covering garments, in order to confirm or underline the health safety of the radiation of the UV-C spectral range serving as a basis for inactivation of the UV-C spectral range, which the IUVA (International Ultraviolet Association) limits to 200 nm-225 nm.

Study/29/investigates defined in vitro inactivation scenarios of multidrug-resistant bacteria by means of UV-C254 nm radiation exposure as well as UV-C222 nm radiation exposure by examining and comparing both the inactivating effect of UV radiation and the occurrence or development of UV-associated lesions of DNA. In this context, the experimenters determined the efficient in vitro inactivation of MRSA (Methicillin-resistant Staphylococcus aureus) stock at both wavelengths. In contrast to UV-C254 nm exposure, almost no UV-associated premutagenic DNA lesions were observed with UV-C222 nm exposure.

The experimenters' "in vitro" studies confirm the efficient UV-C222 nm inactivability of drug-resistant bacteria without UV-C222 nm exposure-induced triggering of mutagenic/premutagenic lesions of cutaneous DNA.

The importance of the respective transmission paths or transmission sources is unmistakable. The detection, recording and analysis of the transmission sources or transmission paths as well as the controllability of their efficiency up to their suppression form the primary control elements of an effective health precaution.

The detection, recording and control of the respiratory transmission pathway is an indispensable key priority in the evaluation of possible transmission scenarios.

Known methods or techniques of disinfection or bacterial and viral disinfection of air spaces are based on exposure to high-energy UV-C radiation. The short-wave UV radiation has a lasting bacterial and viral disinfecting effect. The invasive radiation absorption associated with radiation exposure leads to the destruction of bacterial or viral DNA (deoxyribonucleic acid) as well as its structure and thus to bacterial and viral inactivation. Independent recent studies have confirmed the effectiveness of UV-C radiation for the sustained inactivation of SARS-CoV-2 (corona virus). Studies conducted by Boston University/26/have demonstrated the ability to reduce the SARS-CoV-2 virus population in the exposed airspace by 99.9999% based on exposure to UV-C 254 nm radiation with a radiant power density of 22 Jm/cm2 for an exposure time of 25 seconds. Here, the reduction of radiant power density leads to the increase of exposure time requirement. In the same study, increasing the radiant power density demonstrated the reducibility of the SARS-CoV-2 virus stock of the exposed airspace by 99.9999% with a reduction of the exposure time duration to 6 seconds.

According to the current prior art, ultraviolet radiation within the wavelength range of 200 nm to 280 nm, preferably 254 nm, is used for the disinfection of air and surfaces. The ultraviolet radiation of the UV-C band interacts with the cell structure of the protozoa with a structurally invasive effect and prevents their further spread. The formation of UV resistance or immunity is excluded in this case. The inactivability of multi-resistant hospital germs by means of UV-C exposure has also been successfully demonstrated.

The effect of the high-energy UV-C radiation on complex biological organisms must be evaluated in a differentiated manner. Like UV-A and UV-B exposure, UV-C exposure of the human organism can in principle lead to both acute and chronic cell damage or cell degeneration, depending on the radiation power density as well as exposure time and exposure cycle. Due to such exposure consequences, the IARC (International Agency for Research on Cancer) has classified the wavelength ranges of UV radiation (UV-C100 nm-280 nm/UV-B280 nm-315 nm/UV-A315 nm-400 nm), regardless of whether they are of natural or artificial origin, as carcinogenic. Therefore, the use or application of UV-C radiation for disinfection or sterilization of objects, areas, rooms or habitats used by humans is limited to or reserved for scenarios that exclude human exposure. Thus, disinfection based on UV-C exposure has been successfully applied for years in food production, drinking water treatment and disinfection of ventilation and air conditioning systems. In the Chinese metropolis of Shanghai, this technology has even been taken a step further and is now being used in a car wash for the bacterial and viral disinfection of local buses. Far more forward-looking is the use of autonomously driving robots, the application of which can be registered in many places in Asian hospitals, as well as starting in European hospitals, and the technical equipment of which enables the highly efficient autonomous disinfection of objects and rooms close to life by means of UV-C radiation exposure. However, since these techniques, with their proven and sustained high inactivation efficiency, are associated with a high potential for damage to health, their use is reserved exclusively for viral and bacterial inactivation of inanimate spaces and environments. The applicability in public and busy rooms during the presence of persons is therefore excluded.

Due to the dominance of the respiratory transmission pathway, the viral and bacterial load of the room or ambient air is primarily characterized by the number or density and density distribution of all active viral and bacterial sources present in a room with their viral and bacterial generation potentials. All forms of colonization of closed or semi-closed rooms by active viral and bacterial sources inevitably lead to a source- and source-distribution-dependent viral load of the room air in primary dependence on the respective viral activity potential of each individual viral source and thus to viral imprinting of the totality of the respiratory mechanisms. In this sense, the individual colonizing the room constitutes both the source generating viral load in each case and the recipient receiving the source-induced viral load. As far as the coupling between viral source and viral recipient is determined on a respiratory basis via the transmission path of the room air, viral inactivation of the respiratory transmission path forms the decisive solution approach for the viral decoupling of viral source and viral recipient. Here, the degree of related coupling is determined by the viral load of the room air forming the transmission pathway. The viral load of the room and ambient air, or rather the viral load imposed on it, symbolizes in this context and under the condition of vital populated or animated rooms and environments both the biophysical observable that can be measured and influenced in real time and the target component of any real-time inactivation strategies. In this respect, the necessity for the availability of sustainable and highly efficient instruments and strategies of viral and bacterial inactivation of the respiratory transmission pathway and thus of the room and ambient air under the conditions of vital colonization as well as on the basis of animate rooms and environments is also indispensable and unique.

Such solution strategies based on the generation of UV-C222 nm radiation within the Far-UV-C wavelength window have recently been the subject of detailed scientific and scientific-experimental investigations. Since the generation of electromagnetic waves within this wavelength range is accompanied by a tissue penetration depth that is harmless to the human organism and thus any cell damage within the vital surface tissues of the cutis as well as the cornea can be excluded, insofar as the radiation power or the radiation power density are also measured within defined limits, a potentially distinguishing approach for the concept of system solutions with high inactivation efficiency that are harmless to health and practicable opens up. Current studies, which are mainly based on animal experiments, prove that UV-C222 nm radiation is harmless to health compared to the previously used UV-C254 nm radiation, which is hazardous to health.

The initiators of one of these studies/25/, the collection and preparation of which took place in the Dermatology Department of the Department of Internal Medicine of the Graduate School of Medicine at Kobe University, have demonstrated for the first time worldwide in animal experiments that repeated exposure to ultraviolet radiation of wavelength 222 nm (UV-C) is associated with a high bacterial and viral disinfection capacity without causing the symptomatology of carcinogenicity. UV-C222 nm irradiation did not lead to the development of precancerous lesions or basal cellular or spinocellular carcinomas or to the formation of cataracts in any case in the mice used in this research project, which have a significant sensitivity to incident UV radiation. Here, model mice with xeroderma pigmentosum were repeatedly irradiated with radiation of the UV-C222 nm spectrum. Compared to the wild type of mice, the exposed model mice show an approximately 10,000-fold higher risk of developing skin cancer.

Also, repeated UV-C222 nm radiation exposure did not reveal any carcinogenic symptoms of the skin of the irradiated model mice. Continued microscopic-based analyses also revealed no pathogenic abnormalities. In contrast, all mice in the control group, the exposure of which was based on the use of UV-B radiation (280 nm-315 nm), developed skin cancer.

A large number of mice in this control group also showed corneal damage and cataract symptoms as a result of UV-B radiation exposure. The UV-B wavelength range is identical to the wavelength range of natural solar radiation. UV-B radiation reaches the basal layer at the bottom of the epidermis of the skin and thus damages the DNA (deoxyribonucleic acid) of the cells. In contrast, the UV-C222 nm radiation only reaches the stratum corneum consisting of corneocytes (cell nucleus-less or cell organelle-less squamous epithelial cells) with a layer thickness of 6 µm-15 µm (micrometers) or 6,000 nm-15.000 nm (nanometers) as the uppermost(outermost) layer of the epidermis with a layer thickness of 30 µm-50 µm (micrometers) or 30,000 nm-50, 000 nm (nanometers), on the basis of which damage to the DNA of the epidermal cells is excluded.

Recent research results therefore suggest that UV-C222 nm radiation does not cause damage to the epidermis or cornea and is therefore harmless to human skin and eyes. It is anticipated that this technology can be used in a variety of applications for bacterial and viral inactivation in medical and other sensitive areas. The health safety postulated in the result of this study, which was confirmed in this context in repeated exposure scenarios, suggests the operability of tailored UV-C222 nm radiation sources within busy environments even under CW (continuous wave) mode conditions, taking into account the correlation of exposure time and radiant power density shown in this study.

Taking into account the correlation determined in the Boston University study /26/, the CW mode can lead to a significant reducibility of the respective required radiant power density of the UV-C222 nm radiation and can thus contribute to a significant increase in the degree of health safety of the radiation exposure. The generation of UV-C222 nm radiation is currently based on the use of UV-C sources, the radiation components of which with a wavelength>222 nm are suppressed and consequently not emitted. However, the filters currently used for this purpose have a spectral transmission characteristic, the lower edge steepness of which does not yet ensure the spectral selectivity of the transmission characteristic required for suppression of the longer-wavelength radiation components. However, blocking out the lower frequency radiation components of the UV-C spectrum and thus ensuring a high degree of spectral far-field selectivity is the decisive prerequisite for excluding the ability of UV radiation to penetrate the cell-vital surface tissue of the epidermis as well as the cornea. Based on the current state of scientific knowledge, it can be assumed that the efficiency of radiation-assisted inactivation of harmful microorganisms and viruses as well as bacteria correlates directly with the generability of spectrally tailored and narrowband radiation components within the spectral range of UV-C radiation, preferably within the wavelength range lying below the wavelength of 230 nm. If the generability of broadband tunable narrowband radiation components of definable or controllable radiation power and radiation power density within the spectral range of the UV-C radiation spectrum succeeds, there is the possibility of designing application-oriented UV-C radiation sources with programmable radiation and power density characteristics, respectively adaptive/auto-adaptive synthesis techniques of the UV radiation diagram and thus UV-C radiation sources with high inactivation efficiency as well as with the possibility of health harmless stationary continuous wave mode operability within animate environments.

The derivation of the information technology target segment of the objective of the invention is based on the following evaluation of the known prior art.

The demands on modern data transmission technology with the requirement of modular and wireless network capability as well as the possibility of simultaneous uni- or bidirectional telecommunicative, telemetric and telematic interaction capability with or between any number of users are not met with the currently available technologies. The diversity and simultaneously large number of services to be provided with the associated coverage conditions in the available wavelength ranges of the radio wave spectrum, the spectral assignment of which is given in each case on the basis of the spectral-dependent, propagation-physical possibilities and limitations, increasingly limits the availability of the necessary bandwidths for the transmission channels to be deployed. This, together with the interference sensitivity of the coherent electromagnetic waves of the radio wave spectrum, results in significant limitations for the nationwide long-distance coverage of closed or semi-closed areas, the significance of which in the context of global wireless infrastructure concepts is associated with a significantly increasing growth gradient.

The potential of photonic or optoelectronic information transmission with the significant advantage of being largely harmless to exposure-induced biological interaction components has so far been used almost exclusively for the establishment and operation of terrestrial or even orbital point-to-point links.

With the known or currently available technologies of information transmission in the spectral ranges of microwaves/millimeter waves, the requirements for modern and demand-covering object-related data transmission technologies with the demand for modular and wireless network capability as well as the possibility of simultaneous uni- or bidirectional telecommunicative, telemetric and telematic interaction capability with or between any number of users cannot be met or can only be met selectively. The variety and at the same time multiplicity of the services to be provided with the associated coverage conditions in the available wavelength ranges of the radio wave spectrum, the spectral assignment of which is given in each case on the basis of the spectral-dependent, propagation-physical possibilities and limitations, increasingly limits the availability of the necessary bandwidths for the transmission channels to be deployed. This, together with the interference sensitivity of the coherent electromagnetic waves of the radio wave spectrum, results in significant limitations for the nationwide long-distance coverage of closed or semi-closed areas, the significance of which in the context of global wireless infrastructure concepts is associated with a significantly increasing growth gradient.

Against this technological background, the present invention sets itself the main object of further developing and thus improving a radiation field-based hybrid object-supply system known from the prior art. This main object is achieved by the subject matter of claim 1. Advantageous further developments are the subject of the subclaims dependent thereon and of the following description.

Technical solutions based on the bifunctionality of IR (InfraRed)-photonic and VIS(Visible)-photonic network components as well as UV (Ultraviolet)-photonic network structures or access portals for achieving the objective according to the invention, based on both the information technology objective and the actoric objective, are not known.

In Consideration of:
1. the prior art for bacterial and viral inactivation of rooms and areas as well as the surfaces of stationary and mobile objects therein,
2. the prior art of known and previously discussed investigations or studies on the interaction of selected wavelength ranges of electromagnetic radiation fields of the UV-C spectral range (100 nm-280 nm) with vital biological organisms on the basis of animal experiments, the following strategic conclusions regarding knowledge and solutions can be derived.

Conclusions

1. The use of photonic radiation of the UV (ultraviolet) spectral range or wavelength range (100 nm-400 nm) of the electromagnetic wave spectrum within the UV-B wavelength range (280 nm-315 nm) for the inactivation of harmful microorganisms and viruses is prior art and generally known practice.

2. The general health hazard of the use of ultraviolet radiation postulated so far excluded the elaboration and implementation of conceptual possibilities of health care on the basis of the use of ultraviolet radiation for the disinfection of animated rooms and objects.

3. The background of the health hazard of UV radiation of the UV-A-/UV-B/UV-C spectrum is the interaction of the radiation or radiation energy penetrating into the human biological surface tissue and absorbed there with the tissue cells of the human cutis and/or cornea affected by the incidence, which as a consequence can lead to irreversible transcription and/or replication errors of the cell DNA.

The defined influence on the reproduction conditions of the DNA of health-endangering bacteria and viruses and their related resistance incapacity, which can be achieved by means of acting or introduced electromagnetic radiation fields of the UV-A-/UV-B-/UV-C spectrum, forms the effective approach for the concept of sustainable and reliable bacterial and viral inactivation concepts.

4. The conditional correlation between the wavelength of the electromagnetic effective medium (100 nm-380 nm) and the geometric size of the inactivation objects (viruses 10 nm-350 nm/bacteria 600 nm-1000 nm) promotes the formation of radiation field-related spatial or body resonances. From the point of view of geometric correlation, as well as due to the energetically conditioned increasingly onset of ionization potential, the UV-C radiation spectrum (100 nm 280 nm) forms a highly efficient basis for the reliable and sustainable bacterial and viral inactivation of closed as well as semi-closed rooms or spaces and objects, as well as bacterially and/or virally colonizable/colonized surfaces therein.

5. Current and well-founded medical studies lead to the conclusion that, taking into account the radiation power or radiation density of ultraviolet radiation, permanent exposure within selective spectral ranges of the UV-C spectrum does not lead to any health-endangering effect. Initial investigations in this context have led to proof of harmlessness to health within the UV-C wavelength window of 222 nm.

6. The essential physical/biophysical basis for the health safety assessment of the UV-C wavelength window of 222 nm is the decrease in the penetration depth of the incident electromagnetic radiation field with increasing frequency, i.e. the tissue penetration depth at which the wave field impinging on the tissue surface drops to e-1 times its incident intensity. In addition to the frequency, the dielectric and/or magnetic susceptibility profile, i.e. the physical material properties effective against the incident wave field, are the determining factors for the penetration capability of an alternating-frequency electromagnetic wave field into a biophysical tissue. In this context, the frequency-dependent decrease in the penetration depth of the incident electromagnetic radiation field occurs with indirect proportionality according to the parametric dependence $1/f^{1/2}$, wherein "f" maps the frequency of the incident wave field, or according to the parametric dependence $1/(v/\lambda)^{1/2}$, wherein "v" maps the propagation velocity of the incident wave field and "$\lambda$" maps the wavelength of the incident wave field. In this context, the decrease in penetration depth occurs with direct proportionality to the wavelength of the incident electromagnetic wave field. In the UV-C wavelength ranges below 230 nm, decreasing penetration depths can therefore be assumed, which exclude a direct interaction with the DNA-bearing tissue layers of the cutis, in particular the epidermis as a multilayered squamous epithelium. In this respect, the interaction with regard to human skin is limited to the upper (outer) areas of the stratum corneum, on the basis of which damage to the DNA of the epidermal cells is excluded. With regard to the eyes, the interaction is limited to the upper (outer) layer of the cornea consisting of collagen fibers, as far as damage to health can also be excluded.

7. Taking into account the known techniques according to item 1 as well as based on the findings according to item 3, there is a possibility of concept, development and market introduction of an intelligent object-supply system by using the mechanism of selective UV-assisted inactivation of microorganisms and viruses with the possibilities of communication broadband supply of closed and semi-closed as well as animate objects and rooms based on the use of the UV-C spectrum as a supply medium.

8. The concept according to items 5 to 7 taps the potential of the short-term generatability of a unique and highly innovative product for the service of currently highly topical as well as highly potent key markets of the health care (COVID-19) or the wireless and modular high-speed communication technology.

Presentation of the Basic Idea of the Invention

The key objects of modern object and room or space supply systems or object and room management systems, as well as those oriented to future and predictable demand expectations, are concentrated on the major points according to items I. to VII.

I. Ensuring the stable as well as controllable energy and water supply.

II. Availability and stable operability of controllable/auto-adaptive air conditioning technologies.

III. Availability and controllable and automated operability of indoor air supply systems that are harmless to health IV. 5G/NG (NextGeneration) communications infrastructure supply V. Ensuring the security of the room and object VI. Sensory detection of fire gases and toxic gases contained therein VII. Ensuring the disposal structures and facilities In this context, as well as in the implementation of these key objects, the possibilities and perspectives of information technology with its essential facets of information acquisition as well as information transmission and processing are increasingly moving into the foreground of consideration. Above all, the growing need and the inevitable resulting efforts to be able to and to have to transmit data and information of immense sizes addressed between any stationary as well as mobile users at ultra-fast speeds are increasingly leading to the favoring of wireless concepts of data and information transmission within the framework of both regional and national as well as global considerations. The increase in the importance of mobile communications technology compared to the stationary demand segment, which is associated with a significantly rising growth gradient, also requires a consistent shift towards the development and qualification of high-performance wireless transmission and network technologies. The basis of all wireless transmission technologies is the fundamental usability of the transmission properties of electromagnetic waves of the entire wave spectrum. The main reason for this is the need to transmit more and more information with an almost unimaginable volume of data faster and faster between a rapidly growing number of addressees and recipients. In order to be able to cope with this volume of information exchange today and even more so in the future, the availability of high spectral bandwidths based on high and highest frequencies is required from a technical point of view. The provision of these frequencies is urgently required, if only from the point of view of the existing regulations for the allocation of frequency ranges and their assignment to the respective services, which have been coordinated worldwide between the national network agencies and regulatory authorities. As is well known, the supporting properties of light originate from the electromagnetic waves of high and highest frequencies and thus extremely short wavelengths, which on this basis are associated with the potential to be able to transmit high-rate data with sustained speed. While electromagnetic waves of the high-frequency and microwave range, in addition to their advantageous property of being able to transmit data and information quickly, are accompanied by a number of health hazards that have to be considered in a differentiated manner, light or light as a visible physical image of electromagnetic waves and following the laws of geometric optics basically offers a very comfortable basis in this respect. Light waves are electromagnetic waves that constantly and indispensably accompany our entire life. Nature is born by light, and thereby human life is supported. We also know about both beneficial and detrimental effects of these waves, which, starting from the visible part of our electromagnetic wave spectrum, join both the shorter and longer waves. Hereby, both health-promoting and health-threatening aspects come into our narrower field of vision. These aspects illustrate and touch in a very complex and manifold way a plurality of physical, biological and biophysical effects, which can be achieved by infrared or ultraviolet wave fields or which should be considered. Understandably, the human biological effects are in the foreground of our interest. However, if one broadens the horizon of observation, highly interesting and perspective-rich mechanisms of the targeted influenceability of our living macroscopic as well as microscopic environment can be derived from the interaction between electromagnetic waves and biological organisms exposed on this basis. In this respect, the electromagnetic wave spectrum of visible and invisible light waves also offers the approach for the solution of elementary objects with key position in the sector of room and object supply, which is unmistakably increasing in complexity. Based on this approach, the coupling of IR (InfraRed) photonic and VIS (Visible) photonic system components and network components as well as UV (Ultraviolet) photonic system and network structures and access portals forms the basis and starting point for the spatial and area-wide broadband/ultra broadband supply of stationary and portable or mobile users and user groups within closed and semi closed areas as well as for the configuration of non-contact spatial disinfection and inactivation technologies with the functionality of non-contact and non-hazardous bacterial and viral disinfection of the room air as well as of the surfaces of stationary or mobile objects within the room.

The object derived from this with an information technology objective lies with the configuration of an intelligent communication technology object/room supply system on the basis of wireless modular network technologies and/or modular network-capable transmission system components as the basis for ensuring 5G/NG (Next Generation) coverage of the spatially located or mobile communications technology end or access systems, the primary function and mode of operation of which is based on the use of electromagnetic waves of the ultraviolet spectral range for the spatial and wireless transmission of audio, video and data information. On the other hand, the resulting object with an active objective is the configuration of a sustainable object/room disinfection system, the primary function and mode of action of which is based on the use of electromagnetic waves of the ultraviolet spectral range for achieving the spatial bacterial and viral disinfection potential.

Both objectives and objects derived therefrom are based on the bifunctional use of an alternating frequency/high frequency electromagnetic, preferably photonic, wave field as a means of action/effect and transmission.

Based on the actoric objective, the object is achieved by generating a spectrally broadband radiation wave field with a constant radiation power spectrum within the wavelength range between 190 nm and 230 nm. With the generation of the spectrally broadband radiation wave field within the named wavelength range, the generation of the tailored object energy with the associated interaction parameters takes place as the starting basis for the interaction between the radiation source and the target object of the interaction. In this context:

A1. the amplitude spectrum of the radiation field,
A2. the power and power density spectrum of the source radiation,
A3. the spectral dependent spatial power density distribution or the spectral dependence of the spatial radiation diagram,
A4. the time dependence of the spatial power density distribution, as well as
A5. the polarization spectrum and its temporal signature represent the significant interaction parameters. Their definable or defined measurability or measurement is a fundamental prerequisite for the achievement of the objective. On this basis, the objective is based on a series of experimental investigations of model character, described in the analysis of the currently known prior art, on the interaction between radiation wave fields of wavelengths taken as a point basis and biological model objects. The UV-C radiation exposure of the biological model objects relevant in the present context is based on the spectral punctual or spectral narrowband generation of a UV-C source radiation with divergent and unipolar or linearly polarized radiation characteristics. The system responses which can be derived from the interaction forced by the model thus inevitably represent only the results of a very limited section of the physical observables to be taken as a basis for the interaction scenarios to be considered according to the items A1 to A5. In this respect, the object also consists in the configuration of a modular or modularly operable basic solution for the creation of the source-side system components as an experimental basis for the defined modeling or model synthesis of the interaction scenarios according to items A1 to A5 and their analytical evaluation from both a physical and biological and biophysical point of view. The narrower objective of the defined modeling of the interaction scenarios according to items A1 to A5 consists in the systematic expansion of the interaction horizon compared to the currently known and prior art experimental UV-C exposure scenarios for the purpose of the primarily qualitative expansion of the data collection basis on the basis of the inclusion of additional and significant physical observables with a key position.

The object of broadband radiation field generation within the wavelength range between 190 nm and 230 nm is achieved in this case by generating the radiation field with a constant radiation power spectrum by means of a broadband source "Q" or by means of two or more wavelength-shifted narrowband radiation field sources "Qn" . . . "Qm" with frequency-locked radiant power spectra "fQn" . . . "fQm" or by means of two narrowband radiant field sources "Qs1" and "Qs2" with the controllable radiant power spectra "fQs1" and "fQs2", respectively. "fQs2", wherein the wavelength-related cascading of the sources "Qn" . . . "Qm" with frequency-rigid radiation power spectra "fQn" . . . "fQm" takes place in dependence on their respective power spectral characteristic in such a way that the frequency-dependent superposition of the related components of the radiation power spectrum ensures the constancy of the radiation power over the wavelength range between 190 nm and 230 nm.

According to the invention, two optically collimated or uncollimated, preferably collimated spatially orthogonal linearly polarized wave fields "SLP1" and "SLP2" are selected from the preferably divergent unipolarized source field "SQ" within the wavelength range between 190 nm and 230 nm by means of a transmission member "T1", consisting of the sub-transmission members "T1-1" and "T1-2". According to the invention, the respective spatially orthogonal linearly polarized fields "SLP1" and "SLP2" are each converted into circularly polarized fields by means of a transmission member "T2", consisting of the associated sub-transmission members "T2-1" and "T2-2", in the manner in that by means of the transmission member "T2-1" the linearly polarized wave field "SLP1" is converted into a left-hand circularly polarized wave field "SZP1" and by means of the transmission member "T2-2" the linearly polarized wave field "SLP2" is converted into a right-hand circularly polarized wave field "SZP2".

According to the invention, wave fields of defined polarization signature are thus generated which:

1. with the polarization structure of a unipolarized wave field "SQ".
2. with the polarization structure of two spatially orthogonal linearly polarized wave fields "SLP1" and "SLP2".
3. with the polarization structure of two oppositely circularly polarized wave fields "SZP1" and "SZP2".

can be decoupled from the source system "Q" according to item 1 or from the respective transmission members "T1-1"/"T2-1", "T2-1"/"T2-2" of the transmission system "T" according to item 2 and item 3 by:

4 the unipolarized wave field ""SQ"" according to item 1 at the output of the source system "Q",
5 according to item 2 the optically collimated or uncollimated, preferably collimated linearly polarized wave field SLP1 at the output of the transmission member "T1-1" and the linearly polarized wave field "SLP2" at the output of the transmission member "T1-2",
6 according to item 3 the circularly polarized wave field "SZP1" at the output of the transmission member "T2-1" and the circularly polarized wave field "SZP2" at the output of the transmission member "T2-2"

are available. According to the invention, the wave fields according to items 4 to 6 can be generated both in the constellations "4" or "5" or "6" and in parallel time in the constellations "4/5" or "4/6" or "5/6" as well as "4/5/6".

Furthermore, the object of generating a radiation field within the spectral range "Bf" correlating with the wavelength range from 190 nm to 230 nm is achieved by generating an optically collimated or uncollimated, preferably collimated, radiation field with a constant radiation power spectrum by means of a broadband source "Q" or by means of two or more wavelength-shifted narrowband sources "Qn" ... "Qm" with frequency-rigid radiated power spectra "fQn" ... "fQm" and by means of a preferably magneto-optically active transmission member "TMO" or electro-optically active transmission member "TEO" a broadband, both discretely and continuously tunable narrowband wave field with defined polarization structure is formed. On this basis, the wave field "SQ" is divided by means of a transmission member "T1" into two linearly polarized, preferably spatially orthogonal linearly polarized wave fields. According to the invention, the respective linearly polarized, preferably spatially orthogonal linearly polarized fields are divided by means of a transmission system "T2MO", consisting of one or more transmission members "Tn2MO" with spectral bandpass characteristic "fnB" according to the condition "fnB"<<"Bf" and magnetically both discretely and continuously controllable band center frequency "fnM" or by means of a transmission system "T2EO" consisting of one or more transmission members "Tn2EO" with spectral bandpass characteristic "fnB" according to the condition "fnB"<<<"Bf" and electrically both discretely and continuously controllable band center frequency "fnM" are converted in each case into circularly polarized fields in such a way that by means of the transmission member "Tn2MO-1" or "Tn2EO-1", the linearly polarized wave field "SLP1" is converted into a circularly polarized, preferably left-hand circularly polarized wave field, and the linearly polarized wave field "SLP2" is converted into a circularly polarized, preferably right-hand circularly polarized wave field by means of the transmission member "Tn2MO-2" or "Tn2EO-2". According to the invention, the bandwidths of the transmission spectra of the transmission members "Tn2MO-1"/"Tn2EO-1" and "Tn2MO-2"/"Tn2EO-2" can be dimensioned equal or unequal to each other for the case of coupling of two or more transmission members "Tn2MO-1"/"Tn2EO-1" and "Tn2MO-2"/"Tn2EO-2". The spectral distances of the band center frequencies "fnM" of the transmission members can be dimensioned equal or unequal for the case of coupling of three or more transmission members "Tn2MO-1"/"Tn2EO-1" and "Tn2MO-2"/"Tn2EO-2" among each other.

According to the invention, wave fields of defined signature with both discretely and continuously controllable power spectrum are thus generated, which can be decoupled from the source system "Q" according to item 1 or from the respective transmission members "T1-1"/"T1-2" "T2-1"/"T2-2" of the transmission system "T" according to item 2 and item 3 by:

7 the unipolarized wave field ""SQ"" according to item 1 at the output of the source system "Q",
8 the optically collimated or uncollimated, preferably collimated linearly polarized wave field SLP1 and the linearly polarized wave field "SLP2" according to item 2 at the output of the transmission member "T",
9 the circularly polarized wave field "Tn2MO-1"/"Sn2EO-1" with narrow band and power spectrum fulfilling the condition "fnB"<<"Bf" as well as magnetically or electrically both discretely and continuously controllable band center frequency "fnM" at the output of the transmission member "Tn2MO-1" or "Tn2EO-1" and the circularly polarized wave field "Sn2MO-2"/"Sn2EO-2" with a narrow-band power spectrum satisfying the condition "fnB"<<"Bf" and a magnetically or electrically both discretely and continuously controllable band center frequency "fnM" at the output of the transmission member "Tn2MO-2"/"Tn2EO-2" are available.

According to the invention, in this context, by ensuring a high spectral selectivity of the transmission members as well as ensuring a high degree of far-field selectivity, the decisive prerequisite for the suppression of the longer-wave radiation components (λs>>230 nm) with the significant potential of the penetration or passage ability of the upper layers of the cutis or cornea, which is harmful to health, as well as for the suppression of the shorter-wave radiation components (λs<<190 nm) with the frequency-proportionally increasing potential of the cornea, is achieved.

The ability to generate radiation components with spectrally broadband tunable narrowband amplitude or power and polarization spectra of definable or controllable radiant power and radiant power density within the wavelength range between 190 nm and 230 nm of the UV-C radiation spectrum according to the invention enables the design of application-oriented UV-C radiation sources with programmable or adaptive/auto-adaptive radiation or power density and polarization characteristics and thus the configurability of UV-C radiation sources with high inactivation efficiency and with the possibility of health-harmless stationary continuous wave mode operability within animate environments.

On the basis of the conclusions drawn in accordance with items 10 to 15:

10 Use of radiation of the UV (Ultraviolet) photonic wavelength range of the electromagnetic wave spectrum within the UV-B wavelength range (280 nm-315 nm) for bacterial and viral inactivation is prior art and generally known practice.
11 The fundamental health hazard of the use of UV radiation postulated so far excluded the elaboration and implementation of conceptual possibilities of health care based on the use of ultraviolet radiation for bacterial and viral inactivation of animate rooms or spaces and objects.

12 The background of the health hazard of the UV radiation of the UV-A-/UV-B/UV-C spectrum is the interaction of the radiation or radiation energy penetrating into the human biological surface tissue and absorbed there with the exposed tissue cells of the human cutis and/or cornea, which in its consequence can lead to irreversible transcription and/or replication errors of the cell DNA.

13 The influence on the reproduction conditions of the DNA of harmful bacteria and viruses and their related resistance incapacity, which can be achieved by means of acting electromagnetic radiation fields of the UV-A-/UV-B-/UV-C spectrum, forms the effective approach for the concept of sustainable and reliable bacterial and viral inactivation concepts. The correlation between the wavelength of the effective medium (100 nm-380 nm) and the geometric size of the inactivation objects (viruses 10 nm-350 nm/bacteria 600 nm-1000 nm) promotes the formation of radiation field-related spatial or body resonances. From the point of view of geometric correlation, as well as due to the ionization potential which increasingly sets in with increasing frequency, the UV-C radiation spectrum (100 nm-280 nm) forms a highly efficient basis for the reliable and sustainable bacterial and viral inactivation of closed as well as semi-closed rooms and objects, as well as bacterially and/or virally colonizable/colonized surfaces therein.

14 Current and well-founded medical studies lead to the conclusion that, taking into account the radiation power or radiation density of ultraviolet radiation, permanent exposure within selective spectral ranges of the UV-C spectrum does not lead to any health-endangering effect. Initial investigations in this context have led to proof of harmlessness to health within the UV-C wavelength window of 222 nm.

15 The essential physical/biophysical basis of the health safety assessment of the UV-C wavelength window of 222 nm is the decrease of the penetration depth of the incident electromagnetic radiation field with increasing frequency, i.e. the tissue penetration depth at which the wave field impinging on the tissue surface decreases to e,¬-1 times its incident intensity. In addition to the frequency, the dielectric and/or magnetic susceptibility profile, i.e. the physical material properties effective against the incident wave field, are the determining factors for the penetration capability of an alternating-frequency electromagnetic wave field into a biophysical tissue. In this context, the frequency-dependent decrease in the penetration depth of the incident electromagnetic radiation field occurs with indirect proportionality according to the parametric dependence $1/f^{1/2}$, wherein "f" maps the frequency of the incident wave field, or according to the parametric dependence $1/(v/\lambda)^{1/2}$, wherein "v" maps the propagation velocity of the incident wave field and "λ" maps the wavelength of the incident wave field. In this context, the decrease in penetration depth occurs with direct proportionality to the wavelength of the incident electromagnetic wave field. In the UV-C wavelength ranges below 230 nm, decreasing penetration depths can therefore be assumed, which exclude a direct interaction with the DNA-bearing tissue layers of the cutis, in particular the epidermis as a multilayered squamous epithelium. In this respect, the interaction with regard to human skin is limited to the upper (outer) areas of the keratinocyte layer, on the basis of which damage to the DNA of the epidermal cells is excluded. With regard to the eyes, the interaction is limited to the upper (outer) layer of the cornea consisting of collagen fibers, as far as damage to health can also be excluded.

result in the listed configuration approaches according to items 16 to 20. the basis of the further qualification of the solution according to the invention:

16 In order to exclude both the penetration ability of the generated radiation on the surface layers of the cutis as well as the cornea and thus the interaction with the cell DNA, an upper limitation of the wavelength range of 230 nm is to be provided according to the invention.

17 Due to the geometric conditions of the inactivation objects as well as the ionization potential increasing with decreasing wavelengths, a lower limiting wavelength of 190 nm is to be provided according to the invention.

18 Exposure of the targets of bacterial and viral inactivation is carried out according to the invention under the condition of two- and/or multi-stage CW (continuous wave) mode.

19 The CW (Continuous Wave) modes are triggered remotely programmable and/or auto-adaptive according to the invention.

20 The classification of the CW (continuous wave) modes that can be triggered or activated is based on a parameter-side classification according to the invention.

21 The basis of the discretization of the (continuous wave) mode is formed according to the invention by means of the parameters or characteristics according to subitem 21.1. and subitem 21.2.

21.1 According to the invention, the discretization of the spectral range of the emitted electromagnetic radiation field is carried out.

21.2 According to the invention, the discretization of the power density of the emitted electromagnetic radiation field is performed.

22. The spectral discretization is carried out according to the invention on the basis of the parameters according to subitem 22.1. and subitem 22.2.

22.1 According to the invention, the spectral discretization is based on the generation of an electromagnetic source radiation within the wavelength spectrum between 100 nm and 780 nm by means of an ultrawideband source and discretization of the wideband radiation field by means of optical or magneto-optical narrowband filters or magneto-optical couplers.

22.2 According to the invention, the spectral discretization is based on the generation of an electromagnetic radiation of one or more discrete wavelength ranges "λn" with n=1 to j by means of spectrally fixed and/or spectrally discontinuous and/or continuously tunable narrowband radiation sources.

23. The basis of the discretization of the power density in this context is formed according to the invention by the characteristic variables according to subitem 23.1 and subitem 23.2.

23.1 According to the invention, the radiation power grading is based on the generation of an electromagnetic source radiation within the wavelength spectrum between 100 nm and 780 nm by means of an ultrawideband source of fixed radiation power "S" or discretely and/or continuously controllable radiation power "Sn" with n=1 to j.

23.2 Generation of an electromagnetic radiation by means of one or more radiation sources each of fixed radiation power "S" or each of discretely and/or continuously controllable radiation power "Sn" with n=1 to j.

Since the efficiency of radiation field-based inactivation of harmful microorganisms and viruses is directly linked to the generability of spectrally tailored and narrow-band radiation components of definable or controllable radiant power and radiant power density as well as polarization signature within the spectral range of UV-C radiation, preferably within the wavelength range between 190 nm and 230 nm, the design of application-oriented UV-C radiation sources with programmable or adaptive/auto-adaptive radiation and power density characteristics as well as polarization signature forms the priority basis for the configuration of a demand-oriented and high-performance product solution.

In the context of the present invention, when it is referred to that a "radiation field is generated and qualified both in terms of information technology and actuator technology," it is preferably meant that "the radiation field is arranged to form both the propagatable energy form for wireless transmission of audio and video information and/or data and the object energy for non-contact inactivation of biological objects, preferably viral and/or bacterial objects."

Based on the information technology objective, the object of the invention is to configure a photonic transmission system for the flexible and modular addressed information and communication technology 5G/NG (NextGeneration) supply within the coverage area of both stationary and portable and/or mobile as well as address-related operated information/communication and/or control technology access portals and/or terminals, consisting of a centrally as well as decentrally controllable/programmable intelligent as well as radiation field coupled network or system of network components of photonic 5G/NG (NextGeneration) transmission system components, on the basis of which the room/area-wide user-addressable/addressed bidirectional/unidirectional audio, video and data communication, the use of interdisciplinary and intersectional telematics and telemetry services as well as the operation of special sensory, actuator and communication services for the supply of both spatially located and mobile communication and control infrastructures.

The object is achieved according to the invention by generating a spectrally broadband radiation field with a constant radiation power spectrum within the wavelength range between 190 nm and 230 nm, the broadband radiation field being generated in such a way that the radiation field with a constant radiation power spectrum is generated by means of a broadband source "Q" or by means of two or more wavelength-shifted narrowband radiation field sources "Qn" with "Q1" . . . "Qm" with frequency-rigid radiation power spectra "fQn" . . . "fQm" or by means of two narrowband radiation field sources "Qs1" and "Qs2" with the continuously or discretely, preferably discretely controllable radiation power spectra "fQs1" or "fQs2", wherein the wavelength-related cascading of the sources "Qn" with "Q1" . . . "Qm" with the frequency-rigid radiation power spectra "fQn" with "fQ1" . . . "fQm" takes place in dependence on their respective power spectral characteristic in such a way that the frequency-dependent superposition of the related radiation power spectral components ensures the constancy of the radiation power over the wavelength range between 190 nm and 230 nm.

According to the invention, by means of a transmission member "T1", consisting of the sub-transmission members "T1-1" and "T1-2", two linearly polarized wave fields "SLP1" and "SLP2", respectively, which are preferably spatially orthogonal to each other, are selected from the preferably divergent unipolarized source field within the wavelength range between 190 nm and 230 nm.

According to the invention, the linearly polarized, preferably spatially orthogonal to each other linearly polarized fields "SLP1" and "SLP2" are converted into circularly polarized fields by means of a transmission member "T2", consisting of the sub-transmission members "T2-1" and "T2-2", in such a manner that in that by means of the transmission member "T2-1" the linearly polarized wave field "SLP1" is converted into a circularly polarized wave field, preferably left-hand circularly polarized wave field "SZP1" and by means of the transmission member "T2-2" the linearly polarized wave field "SLP2" is converted into a circularly polarized wave field, preferably right-hand circularly polarized wave field "SZP2".

The linearly polarized wave fields "SLP1" and "SLP2" generated at the output-side gates of the transmission members "Tn1", consisting of the transmission members "Tn1-1" and "Tn1-2" or consisting of the transmission members "T1-1" and "T1-2" for the case n=1, preferably spatially orthogonally to each other linearly polarized wave fields "SLP1" and "SLP2" form according to the invention the input variables of the radiation-coupled transmission members "Tn2-1", consisting of magneto-optically or electro-optically active transmission members "Tn2MO-1" or "Tn2EO-1" or the input variables of the radiation-coupled transmission members "Tn2-2", consisting of magneto-optically or electro-optically active transmission members "Tn2MO-2" or "Tn2EO-2", in that the transmission member "T1-1" generating the linearly polarized wave field signature "SLP1" is coupled to a transmission member "Tn2MO-1"/"Tn2EO-1", and the transmission member "T1-2" generating the linearly polarized wave field signature "SLP2" is coupled to a transmission member "Tn2MO-2"/"Tn2EO-2" the transmission member "Tn2MO-1"/"Tn2EO-1" being coupled by means of a transmission member "Tn2MO-1"/"Tn2EO-1" or by means of a plurality of sub-transmission members "SmTn2MO-1"/"SmTn2EO-1" with m=2 to j and the transmission member "Tn2MO-2"/"Tn2EO-2" is formed by means of a transmission member "Tn2MO-2"/"Tn2EO-2" or by means of several sub-transmission members "SmTn2MO-2"/"SmTn2EO-2" with m=2 to j.

The coupling of the transmission member "T1-1"/"T1-2" with the transmission member "Tn2MO-1"/"Tn2MO-2" or "Tn2EO-1"/"Tn2EO-2" is carried out in accordance with the invention by means of radiation field coupled or radiation field based coupling members.

In accordance with the invention and on the basis thereof, by means of the transmission system "Tn2", in each case including the transmission members "Tn2-1" as well as "Tn2-2", in each case consisting of the transmission members "Tn2MO" or "Tn2EO" and consisting in each case of one transmission member or several sub-transmission members, forming the transmission members "Tn2MO-1"/"Tn2MO-2" with spectral bandpass characteristic "fnB" according to the condition "fnB"<<"Bf" and magnetically both discretely and continuously controllable band center frequency "fnM" or by means of the transmission system "Tn2", in each case including the transmission members "Tn2-1" as well as "Tn2-2", each comprising the transmission members "Tn2MO" or "Tn2EO" and each comprising one transmission member or a plurality of sub-transmission members, forming the transmission members "Tn2EO-1"/"Tn2EO-2" with spectral bandpass characteristic "fnB" according to the condition "fnB"<<"Bf" and electrically both discretely and continuously controllable band center frequency "fnM", preferably consisting of one transmission member or several sub-transmission members, forming the transmission members "Tn2MO-1"/"Tn2MO-2" with spectral bandpass characteristic "fnB" according to the condition "fnB"<<"Bf" and magnetically both discretely and continuously controllable band center frequency "fnM", preferably consisting of the sub-transmission members "SmT2MO-1"/"SmT2MO-2" with m=1 to j, preferably with m=1 to 4 sub-transmission members:

"S1Tn2MO-1" and "S1Tn2MO-2"
"S2Tn2MO-1" and "S2Tn2MO-2"
"S3Tn2MO-1" and "S3Tn2MO-2"
"S4Tn2MO-1" and "S4Tn2MO-2"

discretely or continuously controllable, preferably discretely controllable transmission filters with narrowband spectral bandpass characteristics of high slope steepness as well as high degree of wideband selection are generated.

According to the invention, the output-side wave fields of the transmission member "Tn2", consisting of the sub-transmission members "SmT2MO-1"/"SmT2MO-2" with m=1 to j, preferably with m=1 to 4 sub-transmission members comprise the polarization signature of circular polarization, in that the output-side wave fields of the sub-transmission members "SmT2MO-1" and "SmT2MO-2" are polarized in the same direction or in opposite directions to one another, preferably in opposite directions, and the sub-transmission members "SmT2MO-1" preferably produce a circular left-handed polarization signature and the sub-transmission members "SmT2MO-2" preferably produce a circular right-handed polarization signature.

According to the invention, the spectral bandwidths of the transmission spectra of the "SmTn2MO-1"/"SmTn2MO-2" sub-transmission members can be measured equally or unequally.

In accordance with the invention, the "SmTn2MO-1"/"SmTn2MO-1" sub-transmission members are dimensioned with m=1 to j, preferably with m=1 to 4 mutually different coupling spectra, wherein the band center frequencies of the coupling spectral ranges must satisfy the conditions fkMm>>fkBm and fkMm+1>fkMm as well as fkBm<2 (fkMm+1−fkMm) with m=1 to j.

In accordance with the invention, the coupling spectrum "fn2K-1" or "fn2K-1" of the transmission member "Tn2MO-1" or the sub-transmission members "SmTn2MO-1" is calculated by satisfying or compliance with the conditions fkMm>>fkBm and fkMm+1>fkMm as well as fkBm<2(fkMm+1−fkMm) with m=1 to j, preferably with m=1 to 4, discretely dimensioned or continuously controlled, preferably discretely dimensioned.

According to the invention, the coupling between the transmission members "T1-1"/"T1-2" as well "SmTn2MO-1"/"SmTn2MO-1" is carried out as parallel coupling in such a way that m with m=1 to j, preferably m=4 sub-transmission members "SmTn2MO-1" by means of the radiation field coupled/radiation field based coupling member "Km1/2-1" with m=1 to j, preferably m=1 to 4, to the transmission member "T1-1" and m with m=1 to j, preferably m=4 sub-transmission members "SmTn2MO-2" are coupled to the transmission member "T1-2" by means of the radiation field coupled/radiation field based coupling member "Km1/2-2".

Based on the radiation coupling, the transmission member "Tn2MO-1"/"Tn2MO-2" is coupled to a transmission member "Tn3MO-1"/"Tn3MO-2" according to the invention, the transmission member "Tn3MO-1"/"Tn2MO-2" being formed by means of a transmission member "Tn3MO-1"/"Tn3MO-2" or by means of a plurality of series-coupled or parallel-coupled, preferably parallel-coupled sub-transmission members "SmTn3MO-1"/"SmT32MO-2" with m=2 to k.

By means of the transmission member "Tn3MO-1"/"Tn3MO-2", consisting in each case of one transmission member or several sub-transmission members, forming the transmission members "Tn3MO-1"/"Tn3MO-2" with spectral bandpass characteristic "fnB" according to the condition "fnB"<<"Bf" and electrically both discretely and continuously controllable band center frequency "fnM", preferably consisting of the sub-transmission members "SmT3MO-1"/"SmT3MO-2" with m=1 to j, preferably with m=1 to 4 sub-transmission members:

"S1Tn3MO-1" and "S1Tn3MO-2"
"S2Tn3MO-1" and "S2Tn3MO-2"
"S3Tn3MO-1" and "S3Tn3MO-2"
"S4Tn3MO-1" and "S4Tn3MO-2"

the synthesis is effected discretely or continuously controllable, preferably discretely controllable transmission filters with narrow-band spectral bandpass characteristics of high slope steepness as well as high degree of wide-range selection.

On this basis according to the invention, the sub-transmission members "SmTn3MO-1"/"SmTn3MO-2" are dimensioned with coupling spectra differing from each other by m=2 to k, wherein the band center frequencies of the coupling spectral regions must satisfy the conditions fkMm>>fkBm and fkMm+1>fkMm as well as fkBm<2 (fkMm+1−fkMm) with m=1 to j.

The coupling spectrum "fn2K-1" or "fn2K-2" of the transmission member "Tn3MO-1"/"Tn3MO-2" or of the series-coupled or parallel-coupled, preferably parallel-coupled sub-transmission members "SmTn3MO-1"/"SmTn3MO-2" forming the transmission member "Tn3MO-1"/"Tn3MO-2" can be determined in accordance with the invention by fulfilling or maintaining fkMm>>fkBm and fkMm+1>fkMm as well as fkBm<2 (fkMm+1−fkMm) with m=1 to j can be discretely dimensioned or continuously controlled.

According to the invention, the coupling of the transmission members "Tn2MO-1" and "Tn3MO-1" or "Tn2MO-2" and "Tn3MO-2" is carried out under fulfillment or compliance with the conditions fkMm (Tn2MO-1)=fkMm (Tn3MO-1) or fkMm (Tn2MO-2)=fkMm (Tn3MO-2) as well as the conditions fkBm (Tn2MO-1)=fkBm (Tn3MO-1) or fkBm (Tn2MO-2)=fkBm (Tn3MO-2) and fkMm+1−fkMm of "Tn2MO-1"=fkMm+1−fkMm of "Tn3MO-1" or fkMm+1−fkMm of "Tn2MO-2"=fkMm+1−fkMm of "Tn3MO-2".

In accordance with the invention, the transmission systems "Tn2MO-1/Tn2MO-2" and "Tn3MO-1"/"Tn3MO-2", consisting of the sub-transmission systems:

"S1Tn3MO-1" and "S1Tn3MO-2"
"S2Tn3MO-1" and "S2Tn3MO-2"
"S3Tn3MO-1" and "S3Tn3MO-2"
"S4Tn3MO-1" and "S4Tn3MO-2"

and

"S1Tn3MO-1" and "S1Tn3MO-2"
"S2Tn3MO-1" and "S2Tn3MO-2"
"S3Tn3MO-1" and "S3Tn3MO-2"
"S4Tn3MO-1" and "S4Tn3MO-2"

form a multi-circuit coupler, preferably a two-circuit gyromagnetic coupler with multiple, preferably four, spectrally static or spectrally controllable, preferably spectrally controllable transmission passes.

The transmission system "Tn3MO-1"/"T3MO-2", according to the invention, is radiation-coupled by means of a transmission member "T2", consisting of the sub-transmission members "T2-1" and "T2-2" with the functionality of polarization signature synthesis, preferably a linear polarizer with a statically impressed transfer function, with a transmission system "Tn4", consisting of the transmission members "Tn4MO" or "Tn4EO", in each case comprising the transmission members "Tn4-1" as well as "Tn4-2" and consisting of one transmission member or several sub-transmission members, preferably consisting of the sub-transmission members "SmT4MO-1"/"SmT4MO-2" respectively the sub-transmission members "SmT4EO-1"/"SmT4EO-2" with m=1 to j, preferably with m=1 to 4 sub-transmission members:

"S1Tn4MO-1"/"S1Tn4EO-1" and "S1Tn4MO-2"/"S1Tn4EO-2"
"S2Tn4MO-1"/"S2Tn4EO-1" and "S2Tn4MO-2"/"S2Tn4EO-2"
"S3Tn4MO-1"/"S3Tn4EO-1" and "S3Tn4MO-2"/"S3Tn4EO-2"
"S4Tn4MO-1"/"S4Tn4EO-1" and "S4Tn4MO-2"/"S4Tn4EO-2"

On this basis according to the invention, the resulting oscillation planes of the linearly polarized fields generated on the output side of the transmission system "Tn4" are offset relative to the linearly polarized fields on the input side both discretely and continuously controllably relative to each other in such a way that the linearly oscillating wave fields on the output side of the transmission system "Tn4" have a variable or controllable angular offset of 0 to 90 angular degrees relative to the linear oscillation direction of the wave fields on the input side of the transmission system "Tn4".

According to the invention, the wave fields generated at the output-side gates of the transmission system "Tn4", consisting of the transmission members "Tn4MO-1"/"Tn4EO-1" and "Tn4MO-2"/"Tn4EO-2", respectively, form the input signals of the time-dependent or time-dependent or time-controllable radiation diagram pre-processing system "SV" or the input-side wave fields of the radiation diagram synthesizing transmission members "SVD", forming the function-specific sub-transmission members of the radiation diagram/signal synthesis pre-processing system "SV".

The actoric solutions arising from the object are based on the configurability according to the invention of both wave fields of defined temporal and amplitude spectral signature and wave fields of defined polarization signature. According to the invention, signal gates of defined or definable signal signatures are thus formed. With respect to the polarization signature, signal gates of defined or definable signal signatures are formed by means of the source system "Q", consisting of a solitary source "Q" or several sub-sources "Qn" or of the respective transmission members "Tn1-1"/"Tn1-2" and "Tn2-1"/"Tn2-2" of the transmission system "T" as well as of the radiation-coupled transmission members "Tn2MO-1"/"Tn2MO-2" or "Tn2EO-1"/"Tn2EO-2" and the transmission members "Tn3MO-1"/"Tn3MO-2" or "Tn3EO-1"/"Tn3EO-2" of the transmission system "TMO" or "TEO":

A with the polarization structure of a unipolarized wave field "USQ",
B with the polarization structure of two linearly polarized, preferably two linearly orthogonally polarized wave fields "SLP1" and "SLP2",
C1 with the polarization structure of two circularly polarized, preferably two oppositely circularly polarized wave fields "SZP1" and "SZP2" as well as static transmission spectrum,
C2 with the polarization structure of two circularly polarized, preferably two oppositely circularly polarized wave fields "SfZP1" and "SfZP2" as well as controllable transmission spectrum, in that:
D the unipolarized wave field "USQ" according to letter A at the output of the source system "Q" or "Qn",
E according to letter B the linearly polarized wave field SLP1 at the output of the transmission member "Tn1-1" and the linearly polarized wave field "SLP2" at the output of the transmission member "Tn1-2",
F according to letter C the circularly polarized, preferably left-hand circularly polarized wave field "SZP1" at the output of the transmission member "Tn2-1" and the circularly polarized, preferably right-hand circularly polarized wave field "SZP2" at the output of the transmission member "Tn2-2",
G1 the circularly polarized wave field "SfZP1" with spectrally narrow band and power spectrum fulfilling the condition "fnB"<<"fnM" as well as magnetically or electrically both discretely and continuously controllable band center frequency "fnM" at the output of the transmission member "Tn2MO-1" or "Tn2EO-1",
G2 the circularly polarized wave field "SfZP1" with spectrally narrow band and power spectrum fulfilling the condition "fnB"<<"fnM" as well as magnetically or electrically both discretely and continuously controllable band center frequency "fnM" at the output of the transmission member "Tn3MO-1" or "Tn3EO-1",
H1 the circularly polarized wave field "SfZP2" with spectrally narrow band and power spectrum fulfilling the condition "fnB"<<"fnM" as well as magnetically or electrically both discretely and continuously controllable band center frequency "fnM" at the output of the transmission member "Tn2MO-2" or "Tn2EO-2",
H2 the circularly polarized wave field "SfZP2" with spectrally narrow band and power spectrum fulfilling the condition "fnB"<<"fnM" as well as magnetically or electrically both discretely and continuously controllable band center frequency "fnM" at the output of the transmission member "Tn3MO-2" or "Tn3EO-2", is generated and the wave fields according to the letters D to H are generated both in the constellations "D" or "E" or "F" or "G" or "H" and time-parallel in the constellations "D/E" or "D/F" or "D/G" or "D/H" or "E/F" or "E/G" or "E/H" as well as "D/E/F" and "D/E/F/G" or "D/E/F/H".

The solution according to the invention is based on the generation of a divergent and unipolarized radiation field with a definable radiation power spectrum within the band limits of the broadband source signal spectrum, preferably with a constant amplitude spectrum or radiation power spectrum, wherein the broadband source "Q" generating the source field is indirectly coupled to a magneto-optically active transmission member "TMO" or electro-optically active transmission member "TEO", preferably a magneto-optically active transmission member "TMO". On this basis, the preferably magneto-optical transmission member is formed by means of a magneto-optical circuit or by means of several radiation field coupled magneto-optical circuits, preferably by means of two radiation field coupled circuits. According to the invention, the basis of a magnetic circuit is formed by means of a gyromagnetic coupler consisting of a coupled system of radiation wave field and a magneto-optical aperture excitable by means of a homogeneous static magnetic field up to gyromagnetic resonance, preferably consisting of a single-crystal rare-earth-based ferrimagnetic composite material and a pre-magnetization system. Here, the gyromagnetic coupler generates a spectrally narrowband transmission spectrum with both spectrally high lower and spectrally high upper edge steepness within the source signal spectrum. In this case, the control of the transmission spectral transmission characteristics of the coupler is performed broadband by means of the intensity controllable homogeneous static bias field in the band limits of the output signal of the broadband source "Q". By means of the series coupling of two or more magneto-optical circuits, consisting of two or more gyromagnetic couplers, an electrically controllable transmission filter system with controllable transmission spectrum as well as controllable polarization signature, preferably controllable circular polarization, is formed on this basis.

On the basis of the invention, the wave field of the broadband source "SQ" is divided by means of a transmission member "T1" into two linearly polarized, preferably spatially orthogonal linearly polarized wave fields. According to the invention, the respective linearly polarized, preferably spatially orthogonal linearly polarized fields are transmitted by means of a transmission system "T2MO", consisting of one or more transmission members "Tn2MO" with spectral bandpass characteristic "fnB" according to the condition "fnB"<<"Bf" and magnetically both discretely and continuously controllable band center frequency "fnM" or by means of a transmission system "T2EO" consisting of one or more transmission members "Tn2EO" with spectral bandpass characteristic "fnB" in accordance with the condition "fnB"<<<"Bf" and electrically both discretely and continuously controllable band center frequency "fnM" are converted in each case into circularly polarized fields in such a way that by means of the transmission member "Tn2MO-1" or "Tn2EO-1", the linearly polarized wave field "SLP1" is converted into a circularly polarized, preferably left-hand circularly polarized wave field, and the linearly polarized wave field "SLP2" is converted into a circularly polarized, preferably right-hand circularly polarized wave field by means of the transmission member "Tn2MO-2" or "Tn2EO-2". According to the invention, the bandwidths of the transmission spectra of the transmission members "Tn2MO-1"/"Tn2EO-1" and "Tn2MO-2"/"Tn2EO-2" for the case of coupling of two or more transmission members "Tn2MO-1"/"Tn2EO-1" and "Tn2MO-2"/"Tn2EO-2" can be dimensioned equal or unequal to each other.

According to the invention, the transmission member "T1" generating the linearly polarized wave field "SLP1" is coupled to a transmission member "Tn2MO-1" or "Tn2EO-1" and the transmission member "Tn2MO-1" or "Tn2EO-1" is coupled to a transmission member "Tn3MO-1" or "Tn3EO-1". "Tn2EO-1" is coupled to a transmission member "Tn3MO-1" or "Tn3EO-1", wherein the transmission members "T1" and "Tn2MO-1" or "Tn2EO-1" and "Tn3MO-1" or "Tn3EO-1" are radiation-coupled to one another. According to the invention, the transmission member "Tn2MO-1" or "Tn2EO-1" is synthesized by means of a transmission member "Tn2MO-1" or "Tn2EO-1" or by means of several sub-transmission members "SmTn2MO-1" or "SmTn2EO-1" with m=2 to j, wherein the sub-transmission members "SmTn2MO-1" or "SmTn2EO-1" are dimensioned with m=2 to j coupling spectra differing from one another and the band center frequencies of the coupling spectral ranges must correspond to the conditions fkMm>>fkBm and fkMm+1>fkMm as well as fkBm<2(fkMm+1−fkMm) with m=1 to j.

The coupling spectrum "fn2K-1" or "fn2K-1" of the transmission member "Tn2MO-2" or "Tn2EO-2" or of the sub-transmission members "SmTn2MO-2" or "SmTn2EO-2" can be determined according to the invention by fulfilling or fkMm>>fkBm and fkMm+1>fkMm as well as fkBm<2(fkMm+1−fkMm) with m=1 to j can be discretely dimensioned or continuously controlled.

According to the invention, the transmission member "T2" generating linearly polarized wave field "SPL2" is coupled to a transmission member "Tn2MO-2" or "Tn2EO-2" and the transmission member "Tn2MO-2" or "Tn2EO-2" is coupled to a transmission member "Tn3MO-2" or "Tn3EO-2", wherein the transmission members "T2" and "Tn2MO-2" or "Tn2EO-2" and "Tn3MO-2" or "Tn3EO-2" are radiation-coupled to one another. According to the invention, the transmission member "Tn2MO-2" or "Tn2EO-2" is synthesized by means of a transmission member "Tn2MO-2" or "Tn2EO-2" or by means of several sub-transmission members "SmTn2MO-2" or "SmTn2EO-2" with m=2 to j, wherein the sub-transmission members "SmTn2MO-2" or "SmTn2EO-2" with m=2 to k coupling spectra differing from one another and the band center frequencies of the coupling spectral ranges have to correspond to the conditions fkMm>>fkBm and fkMm+1>fkMm as well as fkBm<2(fkMm+1−fkMm), with m=1 to j.

The coupling spectrum "fn2K-1" or "fn2K-2" of the transmission member "Tn2MO-2" or "Tn2EO-2" or of the sub-transmission members "SmTn2MO-2" or "SmTn2EO-2" can be determined according to the invention by satisfying or fkMm>>fkBm and fkMm+1>fkMm as well as fkBm<2(fkMm+1−fkMm) with m=1 to j can be discretely dimensioned or continuously controlled.

In accordance with the invention, the transmission member "Tn2MO-1" is coupled to a transmission member "Tn3MO-1" and/or the transmission member "Tn2MO-2" and/or "Tn2EO-2" is coupled to a transmission member "Tn3MO-2" and/or "Tn3EO-2", wherein the transmission member "Tn3MO-1" and/or "Tn3EO-1" and/or "Tn3MO-2" or "Tn3EO-2" is formed by means of a transmission member "Tn3MO-1" or "Tn3EO-1" and/or "Tn3MO-2" or "Tn3EO-2" or by means of a plurality of sub-transmission members "SmTn3MO-1" or "SmTn3EO-1" and/or "Tn3MO-2" or "Tn3EO-2" with m=2 to j. According to the invention, the sub-transmission members "SmTn3MO-1"/"SmTn3EO-1" or "SmTn3MO-2"/"SmTn3EO-2" with m=2 to j coupling spectra differing from each other, wherein the band center frequencies of the coupling spectral ranges must correspond to the conditions fkMm>>fkBm and fkMm+1>fkMm as well as fkBm<2(fkMm+1−fkMm) with m=1 to j.

The coupling spectrum "fn3K-1" or "fn3K-2" of the transmission members "Tn3MO-1"/"Tn3EO-1" or "Tn3MO-2"/"Tn3EO-2" or the associated sub-transmission members "SmTn3MO-1"/"SmTn3EO-1" or "SmTn3MO-2"/"SmTn3EO-2" can be discretely dimensioned or continuously controlled if the correlating conditions fkMm>>fkBm and fkMm+1>fkMm as well as fkBm<2(fkMm+1−fkMm) with m=1 to j are fulfilled or maintained, respectively.

On the basis of the invention, the coupling of the transmission members "Tn2MO-1"/"Tn2EO-1" and "Tn3MO-1"/"Tn3EO-1" or of the transmission members "Tn2MO-2"/"Tn2EO-2" and "Tn3MO-2"/"Tn3EO-2" under fulfillment of or in compliance with the condition fkMm ("Tn2MO-1"/"Tn2EO-1")=fkMm ("Tn3MO-1"/"Tn3EO-1") or the condition fkMm ("Tn2MO-2"/"Tn2EO-2")=fkMm ("Tn3MO-2"/"Tn3EO-2") as well as the further correlating condition fkBm ("Tn2MO-1"/"Tn2EO-1")=fkBm ("Tn3MO-1"/"Tn3EO-1") to be taken as a basis or the conditions fkBm ("Tn2MO-2"/"Tn2EO-2")=fkBm ("Tn3MO-2"/"Tn3EO-2") as well as the conditions fkMm+

1−fkMm of "Tn2MO-1"/"Tn2EO-1"=fkMm+1−fkMm of "Tn3MO-1"/"Tn3EO-1" to be fulfilled furthermore respectively fkMm+1 fkMm of "Tn2MO-2"/"Tn2EO-2"=fkMm+1−fkMm of "Tn3MO-2"/"Tn3EO-2".

Under system architecture evaluation, the radiation field coupled transmission members of the coupling configurations or coupling architectures "T1-1"-"Tn2MO-1"/"T1-2"-"Tn2MO-2" form the radiation field based cascade connection of transmission members with both static and controllable transmission characteristics, wherein:

1.1 the transmission subsystem "S1T1-1"/"S1T1-2" of the transmission member "T1-1"/"T1-2" is associated with the functionality of the beam path and beam geometric synthesis, preferably of an optical collimator, 1.2 the transmission subsystem "S2T1-1"/"S2T1-2" of the transmission member "T1-1"/"T1-2" is formed with the functionality of polarization signature synthesis, preferably a linear polarizer with statically impressed transfer function, 1.3 the transmission member "Tn2MO-1"/"Tn2MO-2" is designed with the functionality of the magnetically controllable transmission characteristic, based on the system architecture of a single-circuit or multi-circuit, preferably single-circuit magneto-optical coupler which can be tuned by means of a constant magnetic field, preferably a spectrally controllable gyromagnetic coupler with controllable spectral bandpass characteristic.

The generation of the Constant magnetic field is based on the excitation by means of two or more, preferably two, magnetic circuits, based on the generation of a first static magnetic field component, the generation of which is based on the permanent excitation by means of two or more, preferably two series-coupled magnetic circuits, each having a static magnetic flux density profile, and based on the generation of a second discretely or continuously, preferably continuously controllable static field component, the generation of which is based on the excitation by means of one or more, preferably two series-coupled circuits having a discretely or continuously controllable magnetic flux density profile.

With respect to the system architecture, the radiation field coupled transmission members of the coupling configurations or coupling architectures "T1-1"-"Tn2EO-1"/"T1-2"-"Tn2EO-2" form the radiation-based cascade connection of transmission members with both static and controllable transmission characteristics, where:

1.4 the transmission subsystem "S1T1-1"/"S1T1-2" of the transmission member "T1-1"/"T1-2" is associated with the functionality of the beam path and beam geometric synthesis, preferably of an optical collimator, 1.5 the transmission subsystem "S2T1-1"/"S2T1-2" of the transmission member "T1-1"/"T1-2" is formed with the functionality of polarization signature synthesis, preferably a linear polarizer with statically impressed transfer function, 1.6 the transmission member "Tn2EO-1"/"Tn2EO-2" with the functionality of electrically controllable transmission characteristics, based on the system architecture of a single-circuit or multi-circuit transmission system, consisting of respective electro-optically active material compositions, the displacement profile of which is aligned parallel to the propagation direction of the transmitted electromagnetic wave field by means of an externally generated and parallel to the propagation direction of the electromagnetic wave field and further based on the electrical controllability of the polarization signature of the transmitted wave field generated by means of the external static electric field and based on the Pockels effect, preferably the electrically controllable angle of the oscillation plane of the linearly polarized wave field generated on the output side with respect to the oscillation plane of the linearly polarized wave field generated on the input side.

The generation of the static electric field is here based on the excitation by means of two or more, preferably two electric circuits, consisting of a first static electric field component, the generation of which is based on the excitation by means of one or more parallel-coupled electric circuits, preferably an electric circuit with static dielectric displacement density profile, and consisting of a second discretely or continuously controllable static field component, the generation of which is based on the excitation by means of one or more, preferably two, parallel-coupled electric circuits with discretely or continuously controllable dielectric displacement density profile.

In terms of component functionality, the radiation field coupled transmission members of the coupling configurations or architectures "T1-1"-"Tn2MO-1"/"T1-2"-"Tn2MO-2" form the cascade connection of transmission members of both static and controllable transmission characteristics, wherein:

1.7 the transmission subsystem "S1T1-1"/"S1T1-2" of the transmission member "T1-1"/"T1-2" is associated with the functionality of the beam path and beam geometric synthesis, preferably of an optical collimator, 1.8 the transmission subsystem "S2T1-1"/"S2T1-2" of the transmission member "T1-1"/"T1-2" is formed with the functionality of polarization signature synthesis, preferably a linear polarizer with statically impressed transfer function, 1.9 the transmission member "Tn2MO-1"/"Tn2MO-2" with the functionality of the magnetically controllable transmission characteristic, based on the system architecture of a single-circuit or multi-circuit transmission system, consisting of respective magneto-optically active material compositions, preferably consisting of ferromagnetic/ferrimagnetic garnet compositions, the material composition-specific magnetization of which is aligned parallel to the propagation direction of the transmitted electromagnetic wave field by means of an externally generated constant magnetic field directed parallel to the propagation direction of the electromagnetic wave field and further based on the magnetic controllability of the polarization signature of the transmitted wave field generated by means of the external constant magnetic field and based on the Faraday effect, preferably the magnetically controllable angle of the oscillation plane of the linearly polarized wave field generated on the output side with respect to the oscillation plane of the linearly polarized wave field generated on the input side.

The coupling configuration or coupling architecture of the transmission member "Tn3MO-1"/"Tn3MO-2" forms, with respect to the component functionality, a magneto-optical transmission member, preferably a transmission member with magnetically controllable transmission characteristic, based on the system architecture of a single- or multi-circuit, preferably single-circuit magneto-optical coupler tunable by means of a constant magnetic field, preferably a spectrally controllable gyromagnetic coupler with controllable spectral bandpass characteristic.

The transmission members "T1-1", "T2-1", "T3-1" and "Tn2MO-1"/"Tn2EO-1", "Tn3MO-1"/"Tn3EO-1", "Tn4-MO-1"/"Tn4EO-1" as well as "T1-2", "T2-2, "T3-2" und "Tn2MO-2"/"Tn2EO-2", "Tn3MO-2"/"Tn3EO-2", "Tn4-MO-2"/"Tn4EO-2" form two-port transmission members on the illustrated basis according to the invention in the type of:
 ray-optic passive two-port,
 magneto-optical/electro-optical active and/or passive two-port device and/or
 magneto-optical/electro-optical active and/or passive two-port,
the analytical describability of which is given on the basis of the scattering parameter analysis. On this basis, the transmission system consists of the cascade connection:
 ray-optical passive transmission members,
 magneto-optical/electro-optical active and/or passive transmission members
and/or
 magneto-optical/electro-optical active and/or passive transmission members, consisting of respectively
 single- and/or multi-circuit active and/or passive transmission systems, each with discretely and/or continuously controllable transmission characteristic
or
 parallel connection of two or more cascade connections of optical and/or electro-optically active and/or passive and/or magneto-optically active and/or passive transmission members,
consisting in each case of single-circuit and/or multi-circuit active and/or passive transmission systems with in each case discretely and/or continuously controllable transmission characteristic, the interlinked circuit of which in each case is controlled by means of transmission-engineered single-circuit and/or multi-circuit passive coupling members with impressed coupling spectrum, i.e. impressed frequency dependence of the coupling factor, or by means of transmission-related single-circuit and/or multi-circuit active coupling members with discretely and/or continuously controllable coupling spectrum, i.e. discretely and/or continuously controllable frequency dependence of the coupling factor.

Based on this approach, the coupling scenarios of the transmission and control system components are shown in FIGS. 1 to 4:
 FIG. 1 with system configurations 1.1 and 1.2
 FIG. 2 with the system configuration 1.3
 FIG. 3 with system configurations 2.1 and 2.2
 FIG. 4 with the system configuration 2.3

The radiation coupled transmission members form, in the form of the coupling matrix according to the item I and item IV:
 I "T1"-"Tn2MO-1/2"
 II "T1"-"Tn2EO-1/2"
 III "T3"-"Tn4MO-1/2"
 IV "T3"-"Tn4EO-1/2"
the cascade connection of a discretely or continuously controllable polarizer or polarizer with static polarization signature, preferably a polarizer with static polarization signature, with a transmission member:
 I. based on the system architecture of a single- or multi-circuit gyromagnetic coupler "Tn2MO-1/2" tunable by means of a constant magnetic field.
 II. based on the system architecture of a single- or multi-circuit gyroelectric coupler "Tn2EO-1/2" tunable by means of a static electric field.
 III. based on the system architecture of a single- or multi-circuit gyromagnetic coupler "Tn4MO-1/2" tunable by means of a constant magnetic field.
 IV. based on the system architecture of a single- or multi-circuit gyroelectric coupler "Tn240-1/2" tunable by means of a static electric field.
The cascade connections:
 V "Tn2MO-1"-"Tn3MO-1" and "Tn2MO-2"-"Tn3MO-2"
 VI "Tn2EO-1"-"Tn3EO-1" as well as "Tn2EO-2"-"Tn3EO-2"
form in the system configurations according to item V and item VI:
 V the system architecture of a single- or multi-circuit gyromagnetic coupler tunable by means of a Constant magnetic field,
 VI the system architecture of a single- or multi-circuit gyroelectric coupler tunable by means of a static electric field.

According to item I, the radiation-coupled transmission members in the respective and for the present underlying coupling configurations "T1-1"-"Tn2MO-1" and "T1-2"-"Tn2MO-2" form the cascade connection of transmission members of both static and controllable transmission characteristics, consisting of the radiation coupling of an optical collimator as well as a linear polarizer with statically impressed transmission function and a transmission member with controllable transmission characteristic, based on the system architecture of a single- or multi-circuit gyromagnetic coupler tunable by means of a constant magnetic field, preferably a spectrally controllable magneto-optical coupler with spectral bandpass characteristic. In this context, the magneto-optical coupling is based on the controllability of the transmission spectrum of a gyrotropic selection element that can be pre-magnetized by means of a homogeneous static magnetic field, consisting of a magneto-optical aperture and the electrically controllable pre-magnetization system.

According to item II the radiation-coupled transmission members in the respective coupling configurations "T1-1"-"Tn2EO-1" and "T1-2"-"Tn2EO-2", on which the present case is based, form the cascade connection of transmission members with both static and controllable transmission characteristics, consisting of the radiation coupling of an optical collimator as well as a linear polarizer with a statically impressed transfer function and a transfer link with a controllable transfer characteristic, based on the system architecture of a single-circuit gyroelectric coupler tunable by means of a static electric field, preferably a spectrally controllable electro-optical coupler with a spectral bandpass characteristic. In this context, the electro-optical coupling is based on the controllability of the transmission spectrum of a gyroelectric selection element biased by means of a homogeneous electric field, consisting of an electro-optical aperture and the electrically controllable system of generating the dielectric displacement density.

According to the item III and item IV, the radiation-coupled transmission members form the transmission system "T3"-"Tn4MO-1/2" and "T3"-"Tn4EO-1/2", consisting of the transmission member "T3", consisting of the sub-transmission members "T3-1" and "T3-2" with the functionality of polarization signature synthesis, preferably of a linear polarizer with a statically impressed transmission function and a transmission system "Tn4" consisting of the transmission members "Tn4MO" or "Tn4EO", preferably consisting of the transmission members "Tn4EO", each comprising the transmission members "Tn4-1" as well as "Tn4-2" and consisting of one transmission member or several associated sub-transmission members "SmT4MO-1"/"SmT4MO-2" respectively "SmT4EO-1"/"SmT4EO-2" with m=1 to j, preferably with m=4 sub-transmission members:

"S1Tn4MO-1"/"S1Tn4EO-1" and "S1Tn4MO-2"/"S1Tn4EO-2"

"S2Tn4MO-1"/"S2Tn4EO-1" and "S2Tn4MO-2"/"S2Tn4EO-2"

"S3Tn4MO-1"/"S3Tn4EO-1" and "S3Tn4MO-2"/"S3Tn4EO-2"

"S4Tn4MO-1"/"S4Tn4EO-1" and "S4Tn4MO-2"/"S4Tn4EO-2"

The functionality of this system consists in the both discretely and continuously controllable angular change or rotation of the resulting linear oscillation plane of the linearly polarized fields generated on the output side of the transmission system "Tn4" relative to the resulting linear oscillation plane of the linearly polarized fields generated on the input side of the transmission system "Tn4" in such a way that the linearly oscillating wave fields on the output side of the transmission system "Tn4" can be generated with a variable or controllable angular offset of 0 to 90 angular degrees relative to the linear oscillation direction of the wave fields on the input side of the transmission system "Tn4".

The system configuration of the transmission member "Tn4MO" or the sub-transmission members "SmT4MO-1"/"SmT4MO-2" is based on the system architecture of single- or multi-circuit gyromagnetic couplers tunable by means of a constant magnetic field in accordance with item I, preferably spectrally controllable magneto-optical couplers with spectral bandpass characteristics.

The system configuration of the transmission member "Tn4EO" or the sub-transmission members "SmT4EO-1"/"SmT4EO-2" is based on the system architecture of single- or multi-circuit gyroelectric couplers which can be tuned by means of a static electric field in accordance with item II, preferably spectrally controllable electro-optical couplers with spectral bandpass characteristics.

The magnetic controllability according to item I as well as item III and item V is based here on the generation of a homogeneous magnetic field, the generation of which is based on the excitation by means of two or more magnetic circuits, consisting of a first static constant magnetic field component, the generation of which is based on the permanent excitation by means of two or more series-coupled magnetic circuits with a respective static magnetic flux density profile, wherein the series-coupled magnetic circuits are each based on the static magnetic permanent excitation in analogy to defined sources of impressed static magnetic fields, and consisting of a second discretely or continuously controllable static field component, the generation of which is based on the excitation by means of one or more series-coupled circuits with discretely or continuously controllable magnetic flux density profile, wherein the series-coupled magnetic circuits in analogy to discretely or continuously controllable sources of variable static magnetic fields are each based on the excitation by means of controllable electromagnetic components.

The electrical controllability according to item II as well as item IV and item VI is based on the generation of a static electric field, the generation of which is based on the excitation by means of two or more electric circuits, consisting of a first static electric field component, the generation of which is based on the excitation by means of one or more parallel-coupled electric circuits with static dielectric displacement density profile, and consisting of a second discretely or continuously controllable static field component, the generation of which is based on the excitation by means of one or more parallel-coupled electric circuits with discretely or continuously controllable dielectric displacement density profile.

By means of the coding/access interfaces CMO, consisting of the sub-interfaces CSMO-n with n=1 to j, and by means of the coding/access interfaces CEO, consisting of the sub-interfaces CSEO-n with n=1 to j, there is access on the control side to control both the amplitude-spectral signal signatures of the transmission paths "n" with "n"=1 to j and their polarization-spectral signal signatures in a defined manner. Both the access options for defined controllability of the amplitude-spectral signatures and the polarization signatures of the path signals "n" with n=1 to j, which are available by means of the interfaces CMO, consisting of the sub-interfaces CSMO-n with n=1 to j, and the access options for defined controllability of the amplitude-spectral signatures and the polarization signatures of the path signals "n" with n=1 to j, which are available by means of the interfaces CEO, consisting of the sub-interfaces CSEO-n with n=1 to j, create the procedural basis for the system implementation of high-level hybrid coding and modulation algorithms. On the basis of path-selective signal synthesis, based on the generation of two or more polarization-selective signal paths, preferably two with n=2 polarization-selective signal paths with path-distributed discretely or continuously controllable polarization signature, based on the path-related cascade connection of two or more polarizers with static or discretely or continuously controllable polarization signature, as well as on the basis of complementary and multi-complementary coding or modulation algorithms, is the basis for the configurability of highly transmission-reliable photonic transmission systems.

Based on the extended path selective signal synthesis, based on the generation of two or more polarization selective signal paths with spectrally discrete or continuously controllable transmission spectrum, preferably discrete controllable transmission spectrum, preferably two with n=2 polarization-selective signal paths with path-distributed discretely or continuously controllable polarization signature as well as spectrally controllable transmission spectrum, based on the path-related cascade connection of two or more polarizers with static or discretely or continuously controllable polarization signature, as well as the use of multi-complementary coding or modulation algorithms are the basis for the configurability of highly transmission-reliable photonic transmission systems.

EXEMPLARY EMBODIMENT

The solution according to the invention will be explained in more detail by means of an exemplary embodiment.

By means of a broadband source "Q" with a frequency-rigid radiation power spectrum "fQ", a divergent and uni-polarized radiation field "SQ" in the wavelength range between 190 nm and 230 nm with a constant radiation power spectrum is generated, wherein the divergent and unipolarized radiation field "SQ" forms the input signal source with its source signal "SQ1" of a first radiation-coupled transmission member "T1-1" as well as the input signal source with its source signal "SQ2" of a second radiation-coupled transmission member "T1-2" and the transmission members "T1-1" and "T1-2" are fed with their input signals "SQ1" and "SQ2" in parallel coupling with respect to the radiation source "Q".

By means of the first radiation-coupled transmission member "T1", consisting of a first transmission subsystem "T1-1S1" as well as a second transmission subsystem "T1-1S2", a radiation field with defined beam geometry as well as defined polarization signature is generated from the radiation field "SQ1", in that the subsystem "T1-1S1" is transformed by means of a defined collimation, based on the collimation by means of a lamella collimator "CT1-1", transforming the radiation wave field "SQ1" of the radiation source "Q" into a radiation wave field "SCQ1" with a beam path that is parallel in terms of beam geometry, and the subsystem "T1-1 S2" by means of a defined polarization selection, based on the polarization filtering by means of a broadband linear polarizer "PL1-1" preferably a "wire grid" or Wollaston polarizer, generates the radiation wave field with defined polarization signature "SCPQ1", consisting of the collimated and linearly polarized radiation wave field "SLP1", from the radiation wave field "SCQ1" generated by means of the collimation.

By means of the second radiation-coupled transmission member "T2", consisting of a first transmission subsystem "T1-2S1" as well as a second transmission subsystem "T1-2S2", a radiation field with defined beam geometry as well as defined polarization signature is generated from the radiation field "SQ2", in that the subsystem "T1-2S1" is transformed by means of a defined collimation, based on the collimation by means of a lamella collimator "CT1-2", transforming the radiation wave field "SQ2" of the radiation source "Q" into a radiation wave field "SCQ2" with a beam path that is parallel in terms of beam geometry, and the subsystem "T1-2S2" by means of a defined polarization selection, based on the polarization filtering by means of a broadband linear polarizer "PL1-2", preferably a "wire grid" or Wollaston polarizer, generates the radiation wave field with defined polarization signature "SCPQ2", consisting of the collimated and linearly polarized radiation wave field "SLP2", from the radiation wave field "SCQ2" generated by means of the collimation.

The linearly polarized wave fields "SLP1" and "SLP2" generated at the output-side gates of the transmission members "T1-1" and "T1-2" form the input variables of the radiation-coupled transmission members "Tn2MO-1" and "Tn2MO-2", respectively. "Tn2MO-2" by coupling the transmission member "T1-1" generating the linearly polarized wave field signature "SLP1" to a transmission member "Tn2MO-1" and coupling the transmission member "T1-2" generating the linearly polarized wave field signature "SLP2" to a transmission member "Tn2MO-2". The generation of the linearly polarized wave fields "SLP1" and "SLP2" can here be based both on the fulfillment of the practical conditions:

the oscillation direction of the linear polarization in the same direction to each other
the direction of oscillation of the linear polarization in opposite directions to each other
the mutually spatially orthogonal direction of oscillation of the linear polarization as well as under the proviso:
the mutually arbitrary or arbitrarily selectable oscillation direction of the linear polarization can be carried out. In the present configuration, the generation of the linearly polarized wave fields "SLP1" and "SLP2" is preferably effected under the condition of spatial orthogonality of the linear wave field polarizations.

The radiation-coupled transmission members form in the respective and objectively based coupling configurations "T1-1"-"Tn2MO-1" and "T1-2"-"Tn2MO-2" the cascade connection of transmission members of both static and controllable transmission characteristic, consisting of the radiation coupling of an optical collimator, preferably a lamellar collimator, as well as a linear polarizer with statically impressed transfer function, preferably a "wire grid" or Wollaston polarizer, and a transfer link with controllable transfer characteristic, based on the system architecture of a single-circuit gyromagnetic coupler tunable by means of a constant magnetic field, preferably a spectrally controllable magneto-optical coupler with spectral bandpass characteristic.

In this context, magneto-optical coupling is based on the controllability of the transmission spectrum of a gyrotropic selection element which can be pre-magnetized by means of a homogeneous magnetic field, consisting of a magneto-optical thin-film aperture, consisting of single-crystalline and bismuth-doped yttrium iron garnet $Bi_xY_{3-x}Fe_5O_{12}$, preferably single-crystalline bismuth iron garnet $Bi_3Fe_5O_{12}$ grown from the complete substitution of yttrium by bismuth, and the electrically controllable pre-magnetization system. Due to the significant dependence of the transmission spectral characteristic on the doping of the yttrium-iron garnet as well as its dimensioning, the basis for the targeted optimization of the transmission factor as a function of the transmission frequency exists via the defined substitution of the yttrium as well as the choice of the substituent. In addition to the substituent bismuth used here, the substitution of yttrium by neodymium or praseodymium as well as by lanthanum or cerium and also by erbium leads to garnet compositions with the potential of controlling the transmission spectral characteristic.

The magnetic controllability is here based on the generation of a static magnetic field, the generation of which is based on the excitation by means of two magnetic circuits, consisting of a first magnetic circuit, preferably based on the permanent magnetic excitation by means of magnetic highly anisotropic magnetic alloys, preferably the permanent excitation by means of rare earth based highly anisotropic magnetic alloys, preferably consisting of samarium-cobalt alloys $Sm_2Co_{17}$ or neodymium-iron-boron alloys $Nd_2Fe_{14}B$, and a second discretely or continuously, preferably continuously, controllable static field component, the generation of which is based on excitation by means of two series-coupled circuits having discretely or continuously, preferably discretely with respect to the first circuit and continuously with respect to the second circuit, controllable magnetic flux density profiles, the series-coupled magnetic circuits each being based on excitation by means of controllable electromagnetic components in analogy to discretely or continuously controllable sources of variable static magnetic fields.

By means of the radiation coupling, the transmission member "Tn2MO-1" is coupled to a transmission member "Tn3MO-1", the transmission member "Tn2MO-1" being formed by means of a transmission member "Tn2MO-1" or by means of a plurality of sub-transmission members "SmTn2MO-1" with m=2 to J.

According to the invention, the sub-transmission members "SmTn2MO-1" are dimensioned with m=2 to j coupling spectra differing from each other, wherein the band center frequencies of the coupling spectral ranges must satisfy the conditions $fkMm \gg fkBm$ and $fkMm+1 > fkMm$ as well as $fkBm < 2(fkMm+1-fkMm)$ with m=1 to j. In accordance with the invention, the coupling spectrum "fn2K-1" or "fn2K-1" of the transmission member "Tn2MO-1" or of the sub-transmission members "SmTn2MO-1" is discretely dimensioned or continuously controlled while satisfying or maintaining the conditions fkMm>>fkBm and fkMm+1>fkMm as well as fkBm<2(fkMm+1−fkMm) with m=1 to j.

On the basis of the radiation coupling, the transmission member "Tn2MO-2" is coupled with a transmission member "Tn3MO-2" according to the invention, the transmission member "Tn2MO-2" being formed by means of a transmission member "Tn2MO-2" or by means of several sub-transmission members "SmTn2MO-2" with m=2 to j. In accordance with the invention, the sub-transmission members "SmTn2MO-2" are dimensioned with coupling spectra differing from one another by m=2 to k, wherein the band center frequencies of the coupling spectral ranges must satisfy the conditions fkMm>>fkBm and fkMm+1>fkMm as well as fkBm<2(fkMm+1−fkMm) with m=1 to j. According to the invention, the coupling spectrum "fn2K-1" or "fn2K-2" of the transmission member "Tn2MO-2" or of the sub-transmission members "SmTn2MO-2" is discretely dimensioned or continuously controlled while satisfying or maintaining the conditions fkMm>>fkBm and fkMm+1>fkMm as well as fkBm<2(fkMm+1−fkMm) with m=1 to j.

On the basis of the invention, the coupling of the transmission members "Tn2MO-1" and "Tn3MO-1" or "Tn2MO-2" and "Tn3MO-2" is carried out by fulfilling or maintaining the conditions to be taken as a basis fkMm (Tn2MO-1)=fkMm (Tn3MO-1) or fkMm (Tn2MO-2)=fkMm (Tn3MO-2) and fkBm (Tn2MO-1)=fkBm (Tn3MO-1) or fkBm (Tn2MO-2)=fkBm (Tn3MO-2) and fkMm+1−fkMm of "Tn2MO-1"=fkMm+1−fkMm of "Tn3MO-1" and fkMm+1−fkMm of "Tn2MO-2"=fkMm+1−fkMm of "Tn3MO-2".

The transmission member "Tn3", consisting of the transmission members "Tn3-1" and "Tn3-2", preferably consisting of the transmission members "Tn3MO-1" and "Tn3MO-2" is connected by means of a transmission member "T3", consisting of the transmission members "T3-1" and "T3-2", each consisting of a polarizer with a statically impressed polarization signature, preferably consisting of a polarizer with a statically linear polarization signature, preferably consisting of a "wire grid" or Wollaston polarizer, with a transmission member "Tn4", preferably consisting of the transmission members "Tn4-1" and "Tn4-2", preferably consisting of the transmission members "Tn4EO-1" and "Tn4EO-2" with the sub-transmission members "S1Tn4EO-1"/"S1Tn4EO-2" as well as "S2Tn4EO-1"/"S2Tn4EO-2" radiation-coupled.

The coupling of the polarizers into the output beam path of the transmission member "Tn3" or into the input beam path of the transmission member "Tn4" is effected in such a way that the transmission members "T2-1" and "T2-2" are assigned a mutually identical or different polarization signature, preferably a spatially orthogonal polarization signature.

By means of the radiation-coupled transmission members "S1Tn4EO-1"/"S1Tn4EO-2" as well as "S2Tn4EO-1"/"S2Tn4EO-2", the defined or definable control of the linear polarization signature of the linearly polarized fields generated on the output side of the transmission system "Tn4" with respect to the linearly polarized fields on the input side is effected in that the linearly oscillating wave fields on the output side are generated with a variable or both discretely and continuously, preferably discretely controllable angular offset of 0 to 90 angular degrees with respect to the linear oscillation direction of the input-side wave fields of the transmission system "Tn4".

The transmission system "Tn4", consisting of the transmission systems "S1Tn4EO-1"/"S1Tn4EO-2" as well as "S2Tn4EO-1"/"S2Tn4EO-2" is based on the system architecture of a two-circuit transmission system, based on the electrical controllability of the polarization signature of the transmitted wave field generated by means of an external electrical static field and based on the Pockels effect, preferably the electrical controllability of the electrical angle of the oscillation plane of the linearly polarized wave field generated on the output side with respect to the oscillation plane of the linearly polarized wave field of the transmission system "Tn4" generated on the input side.

On the aforementioned basis, the wave fields available at the output-side gates of the transmission members "Tn4MO-1" and "Tn4MO-2", respectively, form the input signals of the radiation diagram/signal synthesis preprocessing system "SV" and the input-side wave fields of the radiation diagram synthesizing sub-transmission members "SVD" of the radiation diagram/signal synthesis preprocessing system "SV", respectively.

The coding/access interfaces C2MO, consisting of the sub-interfaces CS2MO-1 and CS2MO-2, and C3MO, consisting of the sub-interfaces CS3MO-1 and CS3MO-2, and the coding/access interfaces C4EO, consisting of the sub-interfaces CS4EO-1 and CS3EO-2, provide the control interface for defined control of the amplitude-spectral signal signatures of transmission paths "1" and "2" as well as their polarization-spectral signal signatures. Here, the coding/access interface C4EO, consisting of the sub-interfaces CS4EO-1 and CS3EO-2, forms the control-side access to a defined controllability of the polarization spectrum of the output signal "SfLPF", consisting of the path signals "SfLPF1" and "SfLPF2". By means of the coding/access interface C2MO, consisting of the sub-interfaces CS2MO-1 and CS2MO-2, and by means of the coding/access interface C3MO, consisting of the sub-interfaces CS3MO-1 and CS3MO-2, there is access to the defined controllability of the amplitude spectrum of the path signals "SfLPF1" and "SfLPF2". Both the access options for defined controllability of the amplitude-spectral signal signatures and the polarization signatures of the path signals "1" and "2", which are available via the C2MO and C3MO interfaces and the C4EO interface, create the procedural basis for the system implementation of high-level hybrid coding and modulation algorithms. On the basis of path-selective signal synthesis by means of complementary coding and modulation algorithms, the starting point for the configurability of highly transmission-reliable photonic transmission systems is provided.

Within the scope of the present invention, not only the devices or systems designated in the claims are claimed, but also methods associated therewith, in particular for radiation field-based hybrid object-supply.

All features shown in the general description of the invention, the description of the embodiments, the following claims and in the figures can be essential to the invention both individually and in any combination with each other. These features or combinations of features may each constitute an independent invention, the use of which is expressly reserved. In this context, individual features from the description of an embodiment need not necessarily be combined with one or more or all other features indicated in the description of this embodiment; in this respect, any sub-combination is expressly disclosed. Furthermore, representational features of a device may also find use as process features when reformulated, and process features may find use as representational features of a device when reformulated. Such a reformulation is thus automatically disclosed.

List of Sources/Literature

/01/ SARS-CoV-2 Fact Sheet on Coronavirus Disease-2019 (COVID-19). Robert Koch Institute, Mar. 23, 2020, accessed Aug. 14, 2020.

/02/ Na Zhu, Dingyu Zhang, Wenling Wang et al: A Novel Coronavirus from Patients with Pneumonia in China. In: The New England Journal of Medicine. 2019, doi: 10.1056/NEJMoa2001017.

/03/ Jasper Fuk-Woo Chan, Shuofeng Yuan, Kin-Hang Kok et al: A familial cluster of pneumonia associated with the 2019 novel coronavirus indicating person-to-person transmission: a study of a family cluster. In: The Lancet. Jan. 24, 2020, doi:10.1016/S0140-6736(20)30154-9.

/04/ Michelle L. Holshue, Chas DeBolt et al. for the Washington State 2019-nCoV Case Investigation Team: First Case of 2019 Novel Coronavirus in the United States. In: The New England Journal of Medicine. 31 Jan. 2020, doi: 10.1056/NEJMoa2001191.

/05/ Dongyu Guo: Evaluation of coronavirus in tears and conjunctival secretions of patients with SARS-CoV-2 infection. In: Journal of Medical Virology. Feb. 18, 2020, doi:10.1002/jmv.25725.

/06/ Nicky Phillips, Smriti Mallapaty, David Cyranoski: How quickly does the Wuhan virus spread? In: Nature. 21 Jan. 2020, doi:10.1038/d41586-020-00146-w.

/07/ Zhangkai J. Cheng, Jing Shan: 2019 Novel coronavirus: where we are and what we know. In: Infection. Feb. 18, 2020, doi:10.1007/s15010-020-01401-y.

/08/ How COVID-19 Spreads. In: website of the US Center for Disease Control and Prevention (CDC). Feb. 17, 2020, accessed Feb. 23, 2020.

/09/ SARS-CoV-2 Fact Sheet on Coronavirus Disease-2019 (COVID-19), RKI, as of Oct. 16, 2020, accessed Oct. 25, 2020.

/10/ Transmission of SARS-CoV-2: implications for infection prevention precautions, WHO Scientific Brief, Jul. 9, 2020; accessed Oct. 4, 2020.

/11/ Lydia Bouriba: Turbulent Gas Clouds and Respiratory Pathogen Emissions Potential Implications for Reducing Transmission of COVID-19. In: JAMA. Mar. 26, 2020, doi:10.1001/jama.2020.4756.

/12/ Lirong Zou, Feng Ruan, Mingxing Huang et al: SARS-CoV-2 Viral Load in Upper Respiratory Specimens of Infected Patients. In: The New England Journal of Medicine. 19 Feb. 2020, doi:10.1056/NEJMc2001737.

/13/ Information from the BAuA: Novel virus SARS-CoV-2 (previously 2019-nCoV) classified in risk group 3 by the ABAS and recommendations for laboratory diagnostics given. In: website of the Federal Institute for Occupational Safety and Health (BAuA). Feb. 19, 2020, accessed Feb. 23, 2020.

/14/ N. van Doremalen, T. Bushmaker, D. H. Morris, M. G. Holbrook, A. Gamble, B. N. Williamson, A. Tamin, J. L. Harcourt, N. J. Thornburg, S. I. Gerber, J. O. Lloyd-Smith, E. de Wit, V. J. Munster: Aerosol and Surface Stability of SARS-CoV-2 as Compared with SARS-CoV-1. In: The New England Journal of Medicine. Mar. 17, 2020, doi:10.1056/nejmc2004973.

/15/ Gene Emery: Coronavirus can persist in air for hours and on surfaces for days: study. In: Reuters. Mar. 17, 2020, accessed Aug. 16, 2020.

/16/ Joshua L. Santarpia et al.: Aerosol and surface contamination of SARS-CoV-2 observed in quarantine and isolation care. In: Nature. Jul. 29, 2020, doi: 10.1038/s41598-020-69286-3.

/17/ Cheng V C C, Wong S C, Chen J H K, Yip C C Y, Chuang V W M, Tsang O T Y et al: Escalating infection control response to the rapidly evolving epidemiology of coronavirus disease 2019 (COVID-19) due to SARS-CoV-2 in Hong Kong. Cambridge University Press, Mar. 5, 2020, doi: 10.1017/ice.2020.58.

/18/ Sean Wei Xiang Ong, Yian Kim Tan, Po Ying Chia et al: Air, Surface Environmental, and Personal Protective Equipment Contamination by Severe Acute Respiratory Syndrome Coronavirus 2 (SARS-CoV-2) From a Symptomatic Patient. Mar. 4, 2020, doi: 10.1001/jama.2020.3227.

/19/ Z-D Guo, Z-Y Wang, S-F Zhang et al: Aerosol and surface distribution of severe acute respiratory syndrome coronavirus 2 in hospital wards. Wuhan, China 2020. in: Emerging Infectious Diseases. (Emerg. Infect. Dis.) July 2020, doi: 10.3201/eid2607.200885.

/20/ Changwei Li et al: Airborne transmission of COVID-19: epidemiologic evidence from two outbreak investigations. Research Gate, doi:10.13140/RG.2.2.36685.38881

/21/ J. Lu, J. Gu, K. Li et al: COVID-19 outbreak associated with air conditioning in restaurant, Guangzhou, China, 2020. In: Emerging Infectious Diseases. July 2020, doi: 10.3201/eid2607.200764.

/22/ Lidia Morawska, Junji Cao: "Airborne transmission of SARS-CoV-2: The world should face the reality". In: Environment International. doi: 10.1016/j.envint.2020.105730.

/23/ Lidia Morawska, Donald K. Milton: It is Time to Address Airborne Transmission of COVID-19 In: Clinical Infectious Diseases, ciaa939, https://doi.org/10.1093/cid/ciaa939

/24/ John A. Lednicky: Viable SARS-CoV-2 in the air of a hospital room with COVID-19 patients. In: International Journal of Infectious Diseases Sep. 15, 2020. doi:/10.1016/j.ijid.2020.09.025.

/25/ Nozomi Yamano, Makoto Kunisada, Sachiko Kaidzu, Kazunobu Sugihara, Aiko Nishiaki-Sawada, Hiroyuki Ohashi, Ai Yoshioka, Tatsushi Igarashi, Akihiro Ohira, Masaki Tanito, and Chikako Nishigori: Long-term effects of 222 nm ultraviolet radiation C sterilizing lamps on mice susceptible to ultraviolet radiation In: Photochemistry and Photobiology; doi: 10.1111/php.13269

/26/ Press Release of Signify Corporate Communications from Jun. 16, 2020: Signify and Boston University validate effectiveness of Signify's UV-C light sources on inactivating the virus that causes COVID-19 In: https://www.signify.com/b-dam/signify/en-aa/about/news/2020/20200616

/27/ Manuela Buonanno, David Welch, Igor Shuryak, David J. Brenner: Center for Radiological Research, Columbia University Irving Medical Center, New York: Far-UVC light efficiently and safely inactivates airborne human coronaviruses In: nature research from April 2020 doi: 10.21203/rs.3.rs-25728/v1

/28/ Rich M. Simons, Ernest R. Blatchley III, Karl G. Linden: International Ultraviolet Association. 6935 Wisconsin Avenue: Far UV-C in the 200-225 nm range, and its potential for disinfection applications. Report from July 2020

/29/ Buonanno, M., Ponnaiya, B., Welch, D., Stanislauskas, M., Randers-Pehrson, G., Smilenov, L., Lowy, F. D., Owens, D. M., Brenner, D. J., (2017) "Germicidal Efficacy and Mammalian Skin Safety of 222-nm UV Light" Radiation Research 187(4), 493-501. https://doi.org/10.1667/RR0010CC.1

LIST OF SYMBOLS AND REFERENCE CHARACTERS

Q source
Qn sub-source
Qs radiation source with spectrally defined bandpass characteristic
Qsn sub-source with spectrally defined bandpass characteristic
SQ source/radiation field
SCQ collimated radiation wave field
SCP radiation wave field with defined polarization signature
SCPQ collimated and defined polarized radiation wave field
fQnQ source power spectrum
fQs radiation power spectrum
S radiation power
n natural number
m natural number
natural number
I natural number
j natural number
T radiation optical transmission member
T1 radiation optical transmission member 1
T1-1 sub-transmission member 1 of transmission member 1
T1-2 sub-transmission member 2 of transmission member 1
T2 radiation optical transmission member 2
T2-1 sub-transmission member 1 of transmission member 2
T2-2 sub-transmission member 2 of transmission member 2
T3 polarization synthesis element
SmTnMO magnetooptical sub-transmission member
SmTnEO electro-optical sub-transmission member
USQ unipolarized wave field
SLP1 linear polarized wave field of the transmission member Tn-1
SLP2 linear polarized wave field of the transmission member Tn-2
SfLP1 linear polarized wave field of the transmission member TMO-1/TEO-1 with controllable transmission spectrum
SfLP2 linear polarized wave field of the transmission member TMO-2/TEO-2 with controllable transmission spectrum
SZP1 circularly polarized wave field of the transmission member T2-1
SZP2 circularly polarized wave field of the transmission member T2-2
SfZP1 circularly polarized wave field of the TMO-1/TEO-1 transmission member with controllable transmission spectrum.
SfZP2 circularly polarized wave field of the TMO-2/TEO-2 transmission member with controllable transmission spectrum
TMO magneto-optical transmission system
STMO magneto-optical sub-transmission system
TEO electro-optical transmission system
STEO electro-optical sub-transmission system
SV signal and radiation diagram processing system
SVD radiation diagram synthesis subsystem
MO magneto-optical
EO electrooptical
fnB spectral bandwidth
f frequency
K coupling system
fnM band center frequency
fk coupling spectrum
fkM center frequency of the coupling spectrum
fkB bandwidth of the coupling spectrum
P polarizer
C collimator
CT1-1 collimator system of the transmission member T1-1
CT1-2 collimator system of the transmission member T1-2
SQ1 radiation source field 1 of source Q
SQ2 radiation source field 2 of source Q
PL1-1 linear polarizer of the transmission subsystem T1-1S1
PL1-2 linear polarizer of the transmission subsystem T1-1S2
T1-1S1 transmission subsystem 1 of transmission member T1
T1-1S2 transmission subsystem 2 of transmission member T1
CT2-1 collimator system of the transmission member T2-1
CT2-2 collimator system of the transmission member T2-2
PZ1-1 circular polarizer of the transmission subsystem T2-1S1
PZ1-2 circular polarizer of the transmission subsystem T2-1S2
T2-1 S1 transmission subsystem 1 of transmission member T2
T2-1 S2 transmission subsystem 2 of transmission member T2
VM pre-magnetization system
VMS pre-magnetization subsystem
VMnMO pre-magnetization system TnMO
VEnEO biasing subsystem TnEO
VMSnMO pre-magnetization subsystem TnMO
VESnE biasing subsystem TnEO
CnMO coding/access interface TnMO
CnEO coding/access interface TnEO
SLPF1 linear polarized field controllable oscillation plane
SLPF2 linear polarized field controllable oscillation plane
SfLPF1 spectrally controllable SLPF1
SfLPF2 spectrally controllable SLPF2
SfZP1 spectrally controllable circularly polarized field
SfZP2 spectrally controllable circularly polarized field
UV ultraviolet
IR infrared
$\lambda$ wavelength
$\lambda s$ radiation wavelength
v wave propagation speed
c speed of light
µm micrometer

LIST OF FIGURES

FIG. 1:
Transmission-related system configurations 1.1/1.2
FIG. 2:
Transmission-related system configuration 1.3

FIG. 3:
Transmission-related system configurations 2.1/2.2
FIG. 4:
Transmission-related system configuration 2.3
FIG. 5:
Representation of the transmission-related system configuration of the exemplary embodiment.

The invention claimed is:

1. Radiation field-based hybrid object-supply system, consisting of an arrangement of both signal-generating and signal-capturing and signal-processing transmission and/or system components on the basis of the radiation coupling of UV-optical as well as UV-electrooptical and/or UV-magneto-optical of both active and passive transmission members, characterized in that a UV (ultraviolet) photonic radiation field of a defined polarization signature and a defined geometric, temporal and amplitude signature within the wavelength range between 190 nm and 230 nm is generated and qualified both in terms of information technology and in terms of actuator technology, both on an information technology basis and with a communications technology objective, as a transmission medium for the spatial or area-wide broadband/ultra-broadband supply of stationary and portable or mobile users or user groups within closed and semi-closed rooms and objects or areas, as well as on an actuator technology basis and with an objective in terms of actuator technology as an effective medium for the contactless and health-harmless bacterial and viral inactivation or disinfection of the room air of closed and semi-enclosed rooms and objects or areas, as well as of the surfaces of the objects stationary or movable inside the rooms and objects;

based on the generation of a UV (ultraviolet) photonic radiation field of defined polarization signature as well as defined geometric, temporal and amplitude signature within the wavelength range between 190 nm and 230 nm, a signal-specific access network is configured for access to both the information technology target radiation field and/or signal signatures and the actoric technology target radiation field and/or signal signatures;

within the wavelength range between 190 nm and 230 nm, a spectrally broadband radiation field with a constant radiation power spectrum is generated, wherein the broadband radiation field generation is effected in such a way that the radiation field with a constant radiation power spectrum is generated by means of a broadband source "Q" or by means of two or more wavelength-shifted narrowband radiation field sources "Qsn" with "Qs1" . . . "Qsm" with frequency-rigid radiation power spectra "fQsn" . . . "fQsm" or by means of two narrowband radiation field sources "Qs1" and "Qs2" with the controllable radiation power spectra "fQs1" and "fQs2", wherein the wavelength-related cascading of the sources "Qsn", consisting of the sub-sources "Qs1" . . . "Qsm" with the frequency-rigid radiation power spectra "fQsn" with "fQs1" . . . "fQsm" depending on their respective power spectral characteristics is effected in such a way that the frequency-dependent superposition of the related radiation power spectral components ensures the constancy of the radiation power over the wavelength range between 190 nm and 230 nm;

by means of a transmission member "T1", consisting of the sub-transmission members "T1-1" and "T1-2", two linearly polarized wave fields "SLP1" and "SLP2", preferably spatially orthogonally linearly polarized to each other, are selected from the preferably divergent unipolarized source field within the wavelength range between 190 nm and 230 nm;

the linearly polarized, preferably spatially orthogonally to each other linearly polarized fields "SLP1" and "SLP2" are converted by means of a transmission member "T2", consisting of the sub-transmission members "T2-1" and "T2-2", into circularly polarized fields in the manner in that by means of the transmission member "T2-1" the linearly polarized wave field "SLP1" is converted into a circularly polarized wave field, preferably left-hand circularly polarized wave field "SZP1" and by means of the transmission member "T2-2" the linearly polarized wave field "SLP2" is converted into a circularly polarized wave field, preferably right-hand circularly polarized wave field "SZP2";

the linearly polarized, preferably spatially orthogonally to each other linearly polarized wave fields "SLP1" and "SLP2" generated at the output-side gates of the transmission members "Tn1", consisting of the transmission members "Tn1-1" and "Tn1-2" and/or consisting of the transmission members "T1-1" and "T1-2" for the case n=1, form the input variables of the radiation-coupled transmission members "Tn21", consisting of magneto-optically or electro-optically active transmission members "Tn2MO-1" and/or "Tn2EO-1", and the input variables of the radiation-coupled transmission members "Tn22", consisting of magneto-optically or electro-optically active transmission members "Tn2MO-2" and/or "Tn2EO-2", in that the transmission member "T1-1" generating the linearly polarized wave field signature "SLP1" is coupled to a transmission member "Tn2MO1"/"Tn2EO-1", and the transmission member "T1-2" generating the linearly polarized wave field signature "SLP2" is coupled to a transmission member "Tn2MO-2"/"Tn2EO-2", wherein the transmission member "Tn2MO-1"/"Tn2EO-1" is formed by means of a transmission member "Tn2MO-1"/"Tn2EO-1" or by means of several sub-transmission members "SmTn2MO-1"/"SmTn2EO-1" with m=2 to j, and the transmission member "Tn2MO-2"/"Tn2EO-2" is formed by means of a transmission member "Tn2MO-2"/"Tn2EO-2" or by means of several sub-transmission members "SmTn2MO-2"/"SmTn2EO-2" with m=2 to j;

the coupling of the transmission member "T1-1"/"T1-2" with the transmission member "Tn2MO-1"/"Tn2MO-2" or "Tn2EO-1"/"Tn2EO-2" is effected by means of radiation field-coupled and/or radiation field-based coupling members;

by means of the transmission system "Tn2", in each case including the transmission members "Tn2-1" as well as "Tn2-2", in each case consisting of the transmission members "Tn2MO" or "Tn2EO" and consisting in each case of one transmission member or several sub-transmission members, forming the transmission members "Tn2MO-1"/"Tn2MO-2" with spectral bandpass characteristic "fnB" according to the condition "fnB"<<"Bf" and magnetically both discretely and continuously controllable band center frequency "fnM" or by means of the transmission system "Tn2", in each case including the transmission members "Tn2-1" as well as "Tn2-2", each consisting of the transmission members "Tn2MO" or "Tn2EO" and each consisting of one transmission member or several sub-transmission members, forming or resulting in the transmission members "Tn2EO-1"/"Tn2EO-2" with spectral bandpass characteristic "fnB" according to the condition "fnB"<<"Bf" and electrically both discretely and continuously controllable band center frequency "fnM", preferably consisting of one transmission member or several sub-transmission members, forming or resulting in the transmission members "Tn2MO-1"/"Tn2MO-2" with spectral bandpass characteristic "fnB" according to the condition "fnB"<<"Bf" and magnetically both discretely and continuously controllable band center frequency "fnM", preferably consisting of the sub-transmission members "SmT2MO-1"/"SmT2MO-2" with m=1 to j, preferably with m=1 to 4 sub-transmission members:
"S1Tn2MO-1" and "S1Tn2MO-2"
"S2Tn2MO-1" and "S2Tn2MO-2"
"S3Tn2MO-1" and "S3Tn2MO-2"
"S4Tn2MO-1" and "S4Tn2MO-2"
discretely or continuously controllable, preferably discretely controllable transmission filters with narrow-band spectral bandpass characteristics of high flank steepness as well as high degree of wide-range selection are generated;

the output-side wave fields of the transmission member "Tn2", consisting of the sub-transmission members "SmT2MO-1"/"SmT2MO-2" with m=1 to j, preferably with m=1 to 4 sub-transmission members comprise the polarization signature of circular polarization, in that the output-side wave fields of the sub-transmission members "SmT2MO-1" and "SmT2MO-2" are polarized in the same or opposite sense to one another, preferably in opposite senses, wherein the sub-transmission members "SmT2MO-1" preferably generate a left-hand circular polarization signature and the sub-transmission members "SmT2MO-2" preferably generate a right-hand circular polarization signature;

the spectral bandwidths of the transmission spectra of the sub-transmission members "SmTn2MO-1"/"SmTn2MO-2" are dimensioned equal or unequal, preferably equal to each other;

the sub-transmission members "SmTn2MO-1"/"SmTn2MO-1" are dimensioned with m=1 to j, preferably with m=1 to 4 mutually different coupling spectra, wherein the band center frequencies of the coupling spectral ranges have to satisfy the conditions fkMm>>fkBm and fkMm+1>fkMm as well as fkBm<2 (fkMm+1−fkMm) with m=1 to j;

the coupling spectrum "fn2K-1" or "fn2K-1" of the transmission member "Tn2MO-1" or of the sub-transmission members "SmTn2MO-1" is discretely dimensioned or continuously controlled, preferably discretely dimensioned, while satisfying or maintaining the conditions fkMm>>fkBm and fkMm+1>fkMm and fkBm<2 (fkMm+1−fkMm) with m=1 to j, preferably with m=1 to 4;

the coupling between the transmission members "T1-1"/"T1-2" and "SmTn2MO-1"/"SmTn2MO-1" is effected as a parallel coupling in such a way that m, with m=1 to j, preferably m=4, sub-transmission members "SmTn2MO-1" are coupled by means of the radiation field coupled and/or the radiation field based coupling member "Km1/2-1", with m=1 to j, preferably m=1 to 4, with the transmission member "T1-1", and m, with m=1 to j, preferably m=4, sub-transmission members "SmTn2MO-2" are coupled to the transmission member "T1-2" by means of the radiation field-coupled and/or the radiation field-based coupling member "Km1/2-2";

on the coupling-related basis of the radiation coupling, the transmission member "Tn2MO-1"/"Tn2MO-2" is coupled to a further transmission member "Tn3MO-1"/"Tn3MO-2", wherein the transmission member "Tn3MO-1"/"Tn2MO-2" is formed by means of a transmission member "Tn3MO-1"/"Tn3MO-2" or by means of a plurality of transmission-topologically series-coupled or parallel-coupled, preferably transmission-topologically parallel-coupled sub-transmission members "SmTn3MO-1"/"SmT32MO-2" with m=2 to k;

by means of the transmission member "Tn3MO-1"/"Tn3MO-2", each consisting of one transmission member or several sub-transmission members, forming the transmission members "Tn3MO-1"/"Tn3MO-2" with spectral bandpass characteristic "fnB" according to the condition "fnB"<<"Bf" and electrically both discretely and continuously controllable band center frequency "fnM", preferably consisting of the sub-transmission members "SmT3MO-1"/"SmT3MO-2" with m=1 to j, preferably with m=1 to 4 sub-transmission members:
"S1Tn3MO-1" and "S1Tn3MO-2"
"S2Tn3MO-1" and "S2Tn3MO-2"
"S3Tn3MO-1" and "S3Tn3MO-2"
"S4Tn3MO-1" and "S4Tn3MO-2"
discretely or continuously controllable, preferably discretely controllable transmission filters with narrow-band spectral bandpass characteristics of high flank steepness as well as high degree of wide-range selection are generated;

the sub-transmission members "SmTn3MO-1"/"SmTn3MO-2" are dimensioned with m=2 to k mutually different coupling spectra, wherein the band center frequencies of the coupling spectral regions must satisfy the conditions fkMm>>fkBm and fkMm+1>fkMm as well as fkBm<2 (fkMm+1−fkMm) with m=1 to j;

the coupling spectrum "fn2K-1" or "fn2K-2" of the transmission member "Tn3MO-1"/"Tn3MO-2" or of the series-coupled or parallel-coupled, preferably parallel-coupled sub-transmission members "SmTn3MO-1"/"SmTn3MO-2" forming the transmission member "Tn3MO-1"/"Tn3MO-2" is discretely dimensioned or continuously controlled while fulfilling or complying with the conditions fkMm>>fkBm and fkMm+1>fkMm as well as fkBm<2 (fkMm+1−fkMm) with m=1 to j;

the coupling of the transmission members "Tn2MO-1" and "Tn3MO-1" or "Tn2MO-2" and "Tn3MO-2" is effected while fulfilling or complying with the conditions to be taken as a basis fkMm (Tn2MO-1)=fkMm (Tn3MO-1) or fkMm (Tn2MO-2)=fkMm (Tn3MO-2) and the conditions fkBm (Tn2MO-1)=fkBm (Tn3MO-1) or fkBm (Tn2MO-2)=fkBm (Tn3MO-2) and fkMm+1−fkMm of "Tn2MO-1"=fkMm+1−fkMm of "Tn3MO-1" or fkMm+1−fkMm of "Tn2MO-2"=fkMm+1−fkMm of "Tn3MO-2";

the transmission systems "Tn2MO" and "Tn2MO-1/Tn2MO-2" as well as "Tn3MO" and "Tn3MO-1"/"Tn3MO-2", consisting of the sub-transmission systems:
"S1Tn3MO-1" and "S1Tn3MO-2"
"S2Tn3MO-1" and "S2Tn3MO-2"
"S3Tn3MO-1" and "S3Tn3MO-2"
"S4Tn3MO-1" and "S4Tn3MO-2"
and
"S1Tn3MO-1" and "S1Tn3MO-2"
"S2Tn3MO-1" and "S2Tn3MO-2"

"S3Tn3MO-1" and "S3Tn3MO-2"
"S4Tn3MO-1" and "S4Tn3MO-2"
form a multi-circuit gyromagnetic coupler with several, preferably four, spectrally static or spectrally controllable, preferably spectrally controllable transmission passes;

the transmission system "Tn3MO-1"/"T3MO-2" radiation-coupled by means of a transmission member "T3", consisting of the sub-transmission members "T3-1" and "T3-2" with the functionality of polarization signature synthesis, preferably of a linear polarizer with statically impressed transmission function, with a transmission system "Tn4", consisting of the transmission members "Tn4MO" or "Tn4EO", in each case comprising the transmission members "Tn4-1" and "Tn4-2" and consisting of one transmission member or a plurality of sub-transmission members, preferably consisting of the associated sub-transmission members "SmT4MO-1"/"SmT4MO-2" and/or the associated sub-transmission members "SmT4EO-1"/"SmT4EO-2" with m=1 to j, preferably with m=1 to 4 sub-transmission members:

"S1Tn4MO-1"/"S1Tn4EO-1" and "S1Tn4MO-2"/"S1Tn4EO-2"
"S2Tn4MO-1"/"S2Tn4EO-1" and "S2Tn4MO-2"/"S2Tn4EO-2"
"S3Tn4MO-1"/"S3Tn4EO-1" and "S3Tn4MO-2"/"S3Tn4EO-2"
"S4Tn4MO-1"/"S4Tn4EO-1" and "S4Tn4MO-2"/"S4Tn4EO-2"

the resulting oscillation planes of the linearly polarized fields generated in each case on the output side of the transmission system "Tn4" are offset with respect to the linearly polarized fields on the input side both discretely and continuously controllably with respect to one another in such a way that the linearly oscillating wave fields on the output side of the transmission system "Tn4" are generated with a variable or controllable angular offset of 0 to 90 angular degrees with respect to the linear oscillation direction of the wave fields on the input side of the transmission system "Tn4";

the wave fields generated at the output gates of the transmission system "Tn4", consisting of the transmission members "Tn4MO-1"/"Tn4EO-1" and "Tn4MO-2"/"Tn4EO-2", form the input signals of signal- and diagram-forming transmission components, preferably of the transmission components for the temporally and spatially controllable radiation diagram preprocessing "SV" and on this basis the input wave fields or input signals of the radiation diagram synthesizing sub-transmission members "SVD" of the radiation diagram pre-processing system "SV".

2. Radiation field-based hybrid object-supply system according to claim 1, characterized in that:
2.1. electromagnetic wave fields of defined polarization signature as well as defined or defined controllable polarization spectra and defined or defined controllable power spectra are generated which are generated:
   A. with the polarization structure of a divergent unipolarized wave field "USQ",
   B. with the polarization structure of two linearly polarized, preferably two linearly orthogonally polarized wave fields "SLP1" and "SLP2",
   C1. with the polarization structure of two circularly polarized, preferably two oppositely circularly polarized wave fields "SZP1" and "SZP2" as well as static transmission spectrum
   C2. with the polarization structure/signature of two circularly polarized, preferably two oppositely circularly polarized wave fields "SfZP1" and "SfZP2" and a controllable transmission spectrum by means of the source system "Q", consisting of a solitary source "Q" or several sub-sources "Qn", according to letter A. or of the respective transmission members "Tn1-1"/"Tn1-2" and "Tn21"/"Tn2-2" of the transmission system "T" according to letters B. and C. and from the transmission members "Tn2MO-1"/"Tn2MO-2" and "Tn2EO-1"/"Tn2EO-2" and the transmission members "Tn3MO-1"/"Tn3MO-2" and "Tn3EO-1"/"Tn3EO-2" of the transmission system "TMO" and "TEO" according to letters G and H;

2.2 on the basis corresponding to subitem 2.1 transmitted wave fields of defined polarization signatures as well as defined or definable polarization spectra in accordance with subitems D to H:
   D the divergent unipolarized wave field "USQ" according to letter A. on the output side of the source system "Q" or "Qn"
   E according to letter B the linearly polarized wave field SLP1 at the output of the transmission member "Tn1-1" and the linearly polarized wave field "SLP2" at the output side of the transmission member "Tn1-2"
   F according to letter C the circularly polarized, preferably left-hand circularly polarized wave field "SZP1" at the output of the transmission member "Tn2-1" and the circularly polarized, preferably right-hand circularly polarized wave field "SZP2" at the output side of the transmission member "Tn2-2"
   G1 the circularly polarized wave field "SfZP1" with a spectrally narrowband power spectrum satisfying the condition "fnB"<<"fnM" and a magnetically or electrically both discretely and continuously controllable band center frequency "fnM" on the output side of the transmission member "Tn2MO-1" or "Tn2EO-1"
   G2 the circularly polarized wave field "SfZP1" with spectrally narrow-band and power spectrum fulfilling the condition "fnB"<<"fnM" as well as magnetically or electrically both discretely and continuously controllable band center frequency "fnM" on the output side of the transmission member "Tn3MO-1" or "Tn3EO-1"
   H1 the circularly polarized wave field "SfZP2" with spectrally narrow band and power spectrum satisfying the condition "fnB"<<"fnM" as well as magnetically or electrically both discretely and continuously controllable band center frequency "fnM" at the output of the transmission member "Tn2MO-2" or "Tn2EO-2"
   H2 the circularly polarized wave field "SfZP2" with spectrally narrow band and power spectrum fulfilling the condition "fnB"<<"fnM" as well as magnetically or electrically both discretely and continuously controllable band center frequency "fnM" on the output side of the transmission member "Tn3MO-2" or "Tn3EO-2" are formed, wherein the wave fields according to the letters D to H can be coupled out both in the signature constellations "D" or "E" or "F" or "G" or "H" as well as time-parallel in the signature constellations "D/E" or "D/F" or "D/G" or "D/H" or "E/F" or "E/G" or "E/H" as well as "D/E/F" and "D/E/F/G" or "D/E/F/H";

2.3 the electromagnetic wave fields with circular polarization signature "SfZP1" and "SfZP2" conforming to 2.2.G1/G2 and 2.2.H1/H2 are generated in such a way that:
  an electromagnetic wave field with circular polarization structure/signature "SfZP1", preferably an electromagnetic wave field with left-handed circular polarization signature, is generated within a spectrally narrowly limited range of the source signal spectrum based on a variable band center frequency and satisfying the condition "fnB"<<"fnM",
  by means of a linear polarizer, which is radiation-coupled on the output side of the transmission members "Tn2MO-1" or "Tn2EO-1" as well as "Tn3MO-1" or "Tn3EO-1", an electromagnetic wave field with linear polarization signature "SfLP1" is generated within a spectrally narrowly limited range of the source signal spectrum which is based on a variable band center frequency and fulfills the condition "fnB"<<"fnM",
  an electromagnetic wave field with circular polarization signature "SfZP2", preferably an electromagnetic wave field with dextrorotatory circular polarization signature, is generated within a spectrally narrowly limited range of the source signal spectrum based on a variable band center frequency and satisfying the condition "fnB"<<"fnM",
  by means of a linear polarizer which is radiation-coupled on the output side of the transmission members "Tn2MO-2" or "Tn2EO-2" as well as "Tn3MO-2" or "Tn3EO-2", an electromagnetic wave field with linear polarization signature "SfLP2" is generated within a spectrally narrowly limited range of the source signal spectrum which is based on a variable band center frequency and fulfills the condition "fnB"<<"fnM",
  the polarization signatures of the wave fields "SfLP1" and "SfLP2" with respect to each other satisfy the condition of spatial orthogonality in that the wave fields "SfLP1" are preferably accompanied by a linear vertical polarization signature and the wave fields "SfLP2" are preferably accompanied by a linear horizontal polarization signature,
  an electromagnetic wave field is generated with circular polarization structure "SfnZP1" within n with n=1 to m and preferably 1<m<8 spectrally narrowly limited and in each case based on defined and static band center and band cutoff frequencies "fnM" with n=1 to m and preferably 1<m<8 and "f1M"<"fnM"< "fmM" and satisfying the condition "fnB"<<"fnM",
  an electromagnetic wave field with linear polarization structure "SfnLP1" within n with n=1 to m and preferably 1<m<8 spectrally narrowly limited and in each case based on defined and static band center and band cutoff frequencies "fnM" with n=1 to m and preferably 1<m<8 and "f1M"<"fnM"< "fmM" and satisfying the condition "fnB"<<"fnM",
  an electromagnetic wave field with circular polarization structure "SfnZP2" within n with m=1 to m and preferably 1<m<8 spectrally narrowly limited and in each case based on defined and static band center and band cut-off frequencies "fnM" with n=1 to m and preferably 1<m<8 and "f1M"<"fnM"< "fmM" and satisfying the condition "fnB"<<"fnM",
  an electromagnetic wave field with linear polarization structure "SfnLP2" within n with n=1 to m and preferably 1<m<8 spectrally narrowly limited and in each case based on defined and static band center and band cut-off frequencies "fnM" with n=1 to m and preferably 1<m<8 and "f1M"<"fnM"< "fmM" and satisfying the condition "fnB"<<"fnM",
  the frequency band "Bzp1" of the electromagnetic wave field "SfZP1" and the frequency band "Bzp2" of the electromagnetic wave field "SfZP2" as well as the frequency band "Blp1" of the electromagnetic wave field "SfLP1 and the frequency band "Blp2" of the electromagnetic wave field "SfLP2" is varied cyclically in both discrete-time steps and cyclically continuously in time between two spectral values "f1Q" and "f2Q" of the source field spectrum, preferably between the lower and the upper spectral limit of the source field spectrum;
  the spectral values "f1Q" and "f2Q" of the source field spectrum as well as the variation mode, the cycle times and the cycle steps are manually determined or remotely programmed or controlled on an auto-adaptive basis under evaluation of sensory detectable or detected external biophysical/biochemical observables;
  the frequency bands "Bfnzp1" of the electromagnetic wave fields "SfnZP1" and the frequency bands "Bfnzp2" of the electromagnetic wave fields "SfnZP2" as well as the frequency bands "Bfnlp1" of the electromagnetic wave fields "SfnLP1" and the frequency bands "Bfnlp2" of the electromagnetic wave fields "SfnLP2" are faded in and out cyclically in both discrete-time steps and cyclically continuously in time, and on the basis of this, for the polarization signatures "ZP1"/"Zp2"/"LP1"/"LP2" respectively defined or definable signal combinations are generated in that, by means of the defined or definable fading in and out of the respective n signal spectra which can be generated, a defined or definable sequence of amplitude spectra of the output signals of the transmission members "TMO-1/2" or "TEO-1/2" are formed in each case with respect to the polarization signatures "ZP1"/"Zp2"/"LP1"/ "LP2";
  the signals of the electromagnetic wave fields "SfnZP1"/"SfnZP2" as well as "SfnLP1" "SfnLP2" with:
    "Sf1ZP1" . . . "SfmZP1"
    "Sf1ZP2" . . . "SfmZP2"
  as well as
    "Sf1LP1" . . . "SfmLP1"
    "Sf1LP2" . . . "SfmLP2"
  and their spectral-related signal combinations as well as their variation mode, their cycle times and their cycle steps are determined manually or programmed remotely or are controlled on an auto-adaptive basis under evaluation of sensory detectable or detected external biophysical and/or biochemical observables;
  the amplitudes of the amplitude spectra or the powers of the radiant power spectra of the electromagnetic wave fields "SfnZP1"/"SfnZP2" as well as "SfnLP1" "SfnLP2":
    "Sf1ZP1" . . . "SfmZP1"
    "Sf1ZP2" . . . "SfmZP2"
  as well as
    "Sf1LP1" . . . "SfmLP1"
    "Sf1LP2" . . . "SfmLP2"
  and their spectral-related signal amplitude or power magnitude combinations as well as their variation mode, their cycle times and their cycle steps are determined manually or programmed remotely, or are controlled on an auto-adaptive basis under evaluation of sensorially detectable or detected external biophysical and/or biochemical observables;

2.4 on the basis according to subparagraphs 2.1 to 2.3, transmitted wave fields of defined polarization signatures as well as defined or definable polarization, amplitude and/or power spectra according to letters D to H are generated and on this basis:

combinable wave fields with controllable spectrally continuous and/or spectrally discretized polarization spectra and continuously or discretely controllable amplitude spectra:
with circular polarization signature
with linear polarization signature combinable wave fields with controllable spectrally discretized and/or spectrally continuous polarization spectra and continuously or discretely controllable amplitude spectra are formed:
with circular polarization signature
with linear polarization signature,
the combination ability of which is based on the multiple as well as defined combination of:
amplitude spectral signatures
polarization spectral signatures
temporal signatures
of the formed wave fields.

3. Radiation field-based hybrid object-supply system according to claim 1, characterized in that:

by means of a broadband source "Q", a divergent and unipolarized radiation wave field with a defined or definable radiation power spectrum is generated within the band limits of the broadband source signal spectrum, preferably with a constant radiation power spectrum;

the broadband source "Q" generating the source field is coupled to a magneto-optically active transmission member "TMO" or an electro-optically active transmission member "TEO", preferably a magneto-optically active transmission member "TMO";

the preferably magneto-optical transmission member is formed by means of one magneto-optical circuit or several radiation field coupled magneto-optical circuits, preferably by means of two radiation field coupled circuits;

a magneto-optical circuit is formed by a gyromagnetic coupler consisting of a coupled system of radiation wave field and a magneto-optical aperture excitable by means of a homogeneous static magnetic field up to gyromagnetic resonance, preferably consisting of a single-crystalline rare-earth-based ferro-/ferrimagnetic composite material and a pre-magnetization system;

a spectrally narrowband transmission spectrum with both spectrally high lower and spectrally high upper edge steepness is generated within the source signal spectrum by means of a gyromagnetic coupler;

the center frequency of the transmission band is controlled by means of the intensity controllable homogeneous static bias field broadband in the band limits of the output signal of the broadband source "Q";

by means of the series coupling of two or more magneto-optical circuits, consisting of two or more gyromagnetic couplers, an electrically controllable transmission filter system with controllable transmission spectrum as well as controllable polarization signature, preferably controllable circular polarization, is formed.

4. Radiation field-based hybrid object-supply system according to claim 1, characterized in that:

the wave field "SQ" is divided by means of a transmission member "T1" into two linearly polarized, preferably spatially orthogonal linearly polarized wave fields;

the respective linearly polarized fields, preferably spatially orthogonally linearly polarized to each other, are converted by means of a transmission system "T2MO" consisting of one or more transmission members "Tn2MO" with spectral bandpass characteristic "fnB" according to the condition "fnB"<<"Bf" and magnetically both discretely and continuously controllable and/or controllable band center frequency "fnM", or by means of a transmission system "T2EO" consisting of one or more transmission members "Tn2EO" with spectral bandpass characteristic "fnB" in accordance with the condition "fnB"<<"Bf" and electrically both discretely and continuously controllable band center frequency "fnM" in each case into circularly polarized fields in such a way that the linearly polarized wave field "SLP1" is converted into a circularly polarized, preferably left-hand circularly polarized wave field by means of the transmission member "Tn2MO-1" or "Tn2EO-1" and the linearly polarized wave field "SLP2" is converted into a circularly polarized, preferably right-hand circularly polarized wave field by means of the transmission member "Tn2MO-2" or "Tn2EO-2";

the spectral bandwidths of the transmission spectra of the transmission members "Tn2MO-1"/"Tn2EO-1" and "Tn2MO-2"/"Tn2EO-2" for the case of coupling of two or more transmission members "Tn2MO-1"/"Tn2EO-1" and "Tn2MO-2"/"Tn2EO-2", respectively, are dimensioned equal or unequal, preferably equal, to each other.

5. Radiation field-based hybrid object-supply system according to claim 1, characterized in that:

5.01 the transmission member "T1" generating the linearly polarized wave field "SLP1" according to claim 2 letter B is coupled with a transmission member "Tn2MO-1" or "Tn2EO-1";

5.02 the transmission member "Tn2MO-1" or "Tn2EO-1" is coupled with a transmission member "Tn3MO-1" or "Tn3EO-1";

5.03 the transmission members "T1" and "Tn2MO-1" or "Tn2EO-1" and "Tn3MO-1" or "Tn3EO-1" are radiation-coupled to each other;

5.04 the transmission member "Tn2MO-1" or "Tn2EO-1" is formed by means of a transmission member "Tn2MO-1" or "Tn2EO-1" or by means of several sub-transmission members "SmTn2MO-1" or "SmTn2EO-1" with m=2 to j;

5.05 the sub-transmission members "SmTn2MO-1" or "SmTn2EO-1" are dimensioned with m=2 to j coupling spectra differing from one another, and the assigned band center frequencies of the coupling spectral ranges satisfy the conditions fkMm>>fkBm and fkMm+1>fkMm as well as fkBm<2 (fkMm+1−fkMm) with m=1 to j;

5.06 the coupling spectrum "fn2K-1" or "fn2K-1" of the transmission member "Tn2MO-2" or "Tn2EO-2" or of the sub-transmission members "SmTn2MO-2" or "SmTn2EO-2" is discretely dimensioned or continuously controlled while fulfilling or complying with the conditions of fkMm>>fkBm and fkMm+1>fkMm as well as fkBm<2 (fkMm+1−fkMm) with m=1 to j;

5.07 the transmission member "T2" generating the linearly polarized wave field "SPL2" according to claim 2 letter C is coupled with a transmission member "Tn2MO-2";

5.08 the transmission member "Tn2MO-2" or "Tn2EO-2" is coupled with a transmission member "Tn3MO-2" or "Tn3EO-2";

5.09 the transmission members "T2" and "Tn2MO-2" or "Tn2EO-2" and "Tn3MO-2" or "Tn3EO-2" are radiation-coupled to each other;

5.10 the transmission member "Tn2MO-2" or "Tn2EO-2" is formed by means of a transmission member "Tn2MO-2" or "Tn2EO-2" or several sub-transmission members "SmTn2MO-2" or "SmTn2EO-2" with m=2 to j;

5.11 the sub-transmission members "SmTn2MO-2" or "SmTn2EO-2" are dimensioned with m=2 to k mutually different coupling spectra, and the assigned band center frequencies of the coupling spectral ranges satisfy the conditions fkMm>>fkBm and fkMm+1>fkMm as well as fkBm<2 (fkMm+1−fkMm) with m=1 to j;

5.12 the coupling spectrum "fn2K-1" or "fn2K-2" of the transmission member "Tn2MO-2" or "Tn2EO-2" or of the sub-transmission members "SmTn2MO-2" or "SmTn2EO-2" is discretely dimensioned or continuously controlled while fulfilling or complying with the conditions of fkMm>>fkBm and fkMm+1>fkMm as well as the conditions fkBm<2 (fkMm+1−fkMm) with m=1 to j;

5.13 the transmission member "Tn2MO-1" is coupled with a transmission member "Tn3MO-1" and/or the transmission member "Tn2MO-2" or "Tn2EO-2" is coupled with a transmission member "Tn3MO-2" or "Tn3EO-2";

5.14 the transmission member "Tn3MO-1" or "Tn3EO-1" and/or "Tn3MO-2" or "Tn3EO-2" is formed by means of a transmission member "Tn3MO-1" or "Tn3EO-1" and/or "Tn3MO-2" or "Tn3EO-2" or by means of several sub-transmission members "SmTn3MO-1" or "SmTn3EO-1" and/or "Tn3MO-2" or "Tn3EO-2", with m=2 to j;

5.15 the sub-transmission members "SmTn3MO-1"/"SmTn3EO-1" or "SmTn3MO-2"/"SmTn3EO-2" are dimensioned with m=2 to j coupling spectra differing from each other, and the band center frequencies of the coupling spectral ranges fulfill the conditions of fkMm>>fkBm and fkMm+1>fkMm as well as fkBm<2 (fkMm+1−fkMm), with m=1 to j;

5.16 the coupling spectrum "fn3K-1" or "fn3K-2" of the transmission member "Tn3MO-1"/"Tn3EO-1" or of the transmission member "Tn3MO-2"/"Tn3EO-2" or of the associated sub-transmission members "SmTn3MO-1"/"SmTn3EO-1" or of the sub-transmission members "SmTn3MO-2"/"SmTn3EO-2" is discretely dimensioned or continuously controlled with compulsory fulfillment or compulsory compliance with the correlating conditions fkMm>>fkBm and fkMm+1>fkMm as well as fkBm<2 (fkMm+1−fkMm) with m=1 to j;

5.17 the coupling of the transmission members "Tn2MO-1"/"Tn2EO-1" as well as "Tn3MO-1"/"Tn3EO-1" or of the transmission members "Tn2MO-2"/"Tn2EO-2" and "Tn3MO-2"/"Tn3EO-2" is effected while fulfilling the conditions of fkMm ("Tn2MO-1"/"Tn2EO-1")= fkMm ("Tn3MO-1"/"Tn3EO-1") and fkMm ("Tn2MO-2"/"Tn2EO-2")=fkMm ("Tn3MO-2"/"Tn3EO-2") and fkBm ("Tn2MO-1"/"Tn2EO-1")= fkBm ("Tn3MO-1"/"Tn3EO-1") and fkBm ("Tn2MO-2"/"Tn2EO-2")=fkBm ("Tn3MO-2"/"Tn3EO-2") as well as fkMm+1−fkMm of "Tn2MO-1"/"Tn2EO-1"=fkMm+1−fkMm of "Tn3MO-1"/"Tn3EO-1" or the correlating condition fkMm+1−fkMm of "Tn2MO-2"/"Tn2EO-2"=fkMm+1−fkMm of "Tn3MO-2"/"Tn3EO-2".

6. Radiation field-based hybrid object-supply system according to claim 1, characterized in that:
the transmission members of the coupling configurations "T1-1"-"Tn2MO-1"/"T1-2"-"Tn2MO-2" radiation-field-coupled in accordance with the claims form the cascade connection of transmission members with both static and controllable transmission characteristics, consisting of the radiation field based coupling of the transmission members according to items 6.1 to 6.3, wherein:

6.1 the transmission subsystem "S1T1-1"/"S1T1-2" of the transmission member "T1-1"/"T1-2" is associated with the functionality of the beam path and beam geometric synthesis, preferably of an optical collimator, 6.2 the transmission subsystem "S2T1-1"/"S2T1-2" of the transmission member "T1-1"/"T1-2" is formed with the functionality of polarization signature synthesis, preferably a linear polarizer with statically impressed transfer function, 6.3 the transmission member "Tn2MO-1"/"Tn2MO-2" is formed with the functionality of the magnetically controllable transmission characteristic, based on the system architecture of a single-circuit or multi-circuit, preferably two-circuit magneto-optical coupler which can be tuned by means of a constant magnetic field, preferably a spectrally controllable gyromagnetic coupler with controllable spectral bandpass characteristic; the generation of the Constant magnetic field is based on the excitation by means of two or more, preferably two magnetic circuits, based on the generation of a first static Constant magnetic field component, the generation of which is based on the permanent excitation by means of two or more, preferably two series-coupled magnetic circuits, each having a static magnetic flux density profile, and based on the generation of a second discretely or continuously, preferably continuously controllable direct field component, the generation of which is based on the excitation by means of one or more, preferably two series-coupled circuits having a discretely or continuously controllable magnetic flux density profile; the transmission members of the coupling configurations "T1-1"-"Tn2EO-1"/"T1-2"-"Tn2EO-2" radiation-field-coupled in accordance with the claims form the cascade connection of transmission members with both static and controllable transmission characteristics, consisting of the radiation field based coupling of the transmission members according to items 6.4 to 6.6, wherein:

6.4 the transmission subsystem "S1T1-1"/"S1T1-2" of the transmission member "T1-1"/"T1-2" is associated with the functionality of the beam path and beam geometric synthesis, preferably of an optical collimator, 6.5 the transmission subsystem "S2T1-1"/"S2T1-2" of the transmission member "T1-1"/"T1-2" is formed with the functionality of polarization structure/signature synthesis, preferably a linear polarizer with statically impressed transfer function, 6.6 the transmission member "Tn2EO-1"/"Tn2EO-2" is formed with the functionality of the electrically controllable transmission characteristic, based on the system architecture of a single-circuit or multi-circuit, preferably two-circuit transmission system, consisting of an electro-optical coupler tunable by means of an electric static field, preferably a spectrally controllable gyroelectric coupler with controllable spectral bandpass characteristic;

and the generation of the static electric field is based on the excitation by means of two or more, preferably two electric circuits, consisting of a first static electric field component, the generation of which is based on the excitation by means of one or more parallel-coupled electric circuits, preferably an electric circuit with static dielectric displacement density profile, and consisting of a second discretely or continuously controllable static field component, the generation of which is based on the excitation by means of one or more, preferably two, parallel-coupled electric circuits with discretely or continuously controllable dielectric displacement density profile.

7. Radiation field-based hybrid object-supply system according to claim 1, characterized in that:

7.1 the transmission system "Tn4", consisting of the transmission members "Tn4MO" or "Tn4EO", each comprising the transmission members "Tn4-1" and "Tn4-2" and consisting of one transmission member or several sub-transmission members, preferably consisting of the sub-transmission members "SmT4MO-1"/"SmT4MO-2" or the complementary sub-transmission members "SmT4EO-1"/"SmT4EO-2" with m=1 to j, preferably with m=1 to 4 sub-transmission members:

"S1Tn4MO-1"/"S1Tn4EO-1" and "S1Tn4MO-2"/"S1Tn4EO-2"

"S2Tn4MO-1"/"S2Tn4EO-1" and "S2Tn4MO-2"/"S2Tn4EO-2"

"S3Tn4MO-1"/"S3Tn4EO-1" and "S3Tn4MO-2"/"S3Tn4EO-2"

"S4Tn4MO-1"/"S4Tn4EO-1" and "S4Tn4MO-2"/"S4Tn4EO-2"

the resulting oscillation planes of the linearly polarized fields generated in each case on the output side of the transmission system "Tn4" are offset with respect to the linearly polarized fields on the input side in a manner which is both discrete and continuously controllable with respect to one another in that:

7.2 the transmission member "Tn4MO-1"/"Tn4MO-2" with the functionality of the magnetically controllable transmission characteristic is formed based on the system architecture of a single-circuit or multi-circuit, preferably double-circuit magneto-optical coupler, consisting of respective magneto-optically active material compositions, preferably consisting of ferromagnetic/ferrimagnetic garnet compositions, the material composition-specific magnetization of which is oriented parallel to the propagation direction of the transmitted electromagnetic wave field by means of an externally generated constant magnetic field directed parallel to the propagation direction of the electromagnetic wave field, and further based on the magnetic controllability of the polarization signature of the transmitted wave field generated by means of the external constant magnetic field and based on the Faraday effect, preferably the magnetically controllable angle of the oscillation plane of the linearly polarized wave field generated on the output side with respect to the oscillation plane of the linearly polarized wave field generated on the input side;

7.3 the transmission member "Tn4EO-1"/"Tn4EO-2" with the functionality of electrically controllable transmission characteristics is formed based on the system architecture of a single-circuit or multi-circuit transmission system, consisting of respective electro-optically active material compositions, the material composition-specific dipole moment and/or dielectric displacement profile of which is aligned parallel to the propagation direction of the transmitted electromagnetic wave field by means of an externally generated static electric field directed parallel to the propagation direction of the transmitted electromagnetic wave field, and further based on the electrical controllability of the polarization structure/signature of the transmitted wave field generated by means of the external static electric field and based on the Pockels effect, preferably the electrically controllable angle of the oscillation plane of the linearly polarized wave field generated on the output side with respect to the oscillation plane of the linearly polarized wave field generated on the input side.

8. Radiation field-based hybrid object-supply system according to claim 1, characterized in that:

by means of the functionality of the magnetically controllable transmission characteristic of the transmission members "TMO-n", with n=1 to j, based on the discretely or continuously controllable generation of static homogeneous magnetic fields by means of the pre-magnetization system components "VMMO-n", with n=1 to j, the control-side access to a discrete or continuous controllability of the amplitude-spectral and/or polarization-spectral signal signatures of the wave fields or signals transmitted by means of the transmission members "TMO-n", with n=1 to j, is formed and configured by means of the coding/access interfaces CMOn, with n=1 to j;

by means of the defined functionality of the electrically controllable transmission characteristics of the transmission members "TEO-n", with n=1 to j, based on the discretely or continuously controllable generation of static homogeneous electric fields by means of the biasing system components "VEEO-n" with n=1 to j, the control-side access to a discrete or continuous controllability of the amplitude-spectral and/or polarization-spectral signal signatures of the wave fields and/or signals transmitted by means of the transmission members "TEO-n", with n=1 to j, is formed and configured by means of the coding/access interfaces CEOn, with n=1 to j;

the access on the control side is formed by means of the coding/access interfaces CMO, consisting of the sub-interfaces CSMO-n with n=1 to j, and by means of the coding/access interfaces CEO, consisting of the sub-interfaces CSEO-n with n=1 to j, in order to control both the amplitude-spectral signal signatures of the transmission paths "n" with "n"=1 to j and their polarization-spectral signal signatures in a defined manner;

the procedural basis for the system-technical implementation of high-grade hybrid coding and/or modulation algorithms is created by means of the access possibilities of the defined controllability of the amplitude spectral signatures as well as the polarization signatures of the path signals "n" with n=1 to j, based on the interfaces CMO, consisting of the sub-interfaces CSMO-n with n=1 to j, as well as the interfaces CEO, consisting of the sub-interfaces CSEO-n with n=1 to j;

the starting basis for the configurability of highly transmission-reliable photonic transmission systems is formed by means of the path-selective signal synthesis, based on the generation of two or more polarization-selective signal paths, preferably two signal paths with n=2 polarization-selective signal paths with path-distributed discretely or continuously controllable polarization signature, based on the path-related cascade connection of two or more polarizers with static or discretely or continuously controllable polarization signature, as well as the use of complementary and multi-complementary coding and/or modulation algorithms;

the starting basis for the configurability of highly transmission-reliable photonic transmission systems is formed by means of extended path-selective signal synthesis, based on the generation of two or more polarization-selective signal paths with spectrally discrete or continuously controllable transmission spectrum, preferably discrete controllable transmission spectrum, preferably two signal paths with n=2 polarization-selective signal paths with path-distributed discrete or continuously controllable polarization signature as well as spectrally controllable transmission spectrum, based on the path-related cascade connection of two or more polarizers with static or discretely or continuously controllable polarization signature, as well as the use of multi-complementary coding and/or modulation algorithms.

\* \* \* \* \*